(12) United States Patent
Sangu et al.

(10) Patent No.: US 8,895,910 B2
(45) Date of Patent: Nov. 25, 2014

(54) OPTICAL ELEMENT AND A LIGHT DETECTION DEVICE AND AN OBJECT SENSING SYSTEM

(75) Inventors: Suguru Sangu, Kanagawa (JP); Atsushi Sakai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 377 days.

(21) Appl. No.: 13/421,281

(22) Filed: Mar. 15, 2012

(65) Prior Publication Data

US 2012/0235027 A1    Sep. 20, 2012

(30) Foreign Application Priority Data

Mar. 18, 2011  (JP) .................................. 2011-061629
Jan. 27, 2012  (JP) .................................. 2012-015594

(51) Int. Cl.
| | | |
|---|---|---|
| *G02B 3/00* | (2006.01) | |
| *G02B 3/06* | (2006.01) | |
| *G01J 5/00* | (2006.01) | |
| *G01J 5/08* | (2006.01) | |
| *G08B 13/193* | (2006.01) | |

(52) U.S. Cl.
CPC ................ *G02B 3/06* (2013.01); *G02B 3/0043* (2013.01); *G01J 5/0025* (2013.01); *G01J 5/0815* (2013.01); *G02B 3/0068* (2013.01); *G08B 13/193* (2013.01)
USPC ............ 250/216; 250/353; 359/290; 359/664

(58) Field of Classification Search
CPC .......... G02B 3/00; G02B 3/0043; G02B 3/06; G02B 3/10; G02B 13/0015; G02B 13/008; G02B 13/14; H01L 31/0232
USPC ............. 250/221, 222.1, 216, 239, 340, 353; 359/290, 291, 350, 642, 664, 796
See application file for complete search history.

(56) References Cited

U.S. PATENT DOCUMENTS

| | | | |
|---|---|---|---|
| 4,322,124 A * | 3/1982 | Padgitt et al. ................. 250/353 |
| 4,740,701 A | 4/1988 | Wüthrich et al. | |
| 5,022,725 A * | 6/1991 | Matsunami et al. .......... 359/726 |
| 5,107,120 A | 4/1992 | Tom | |
| 2007/0152156 A1 | 7/2007 | Zhevelev et al. | |
| 2008/0112057 A1 | 5/2008 | Ono et al. | |

FOREIGN PATENT DOCUMENTS

| | | |
|---|---|---|
| GB | 2 207 523 A | 2/1989 |
| JP | 2008-128913 | 6/2008 |
| JP | 2008-166234 A | 7/2008 |

OTHER PUBLICATIONS

Extended European Search Report issued Jun. 14, 2012, in European Patent Application No. 12159779.3.

* cited by examiner

*Primary Examiner* — Kevin Pyo
(74) *Attorney, Agent, or Firm* — Oblon, Spivak, McClelland, Maier & Neustadt, L.L.P.

(57) ABSTRACT

An optical element for condensing light is provided, wherein the optical element has a first cylindrical face and a second cylindrical face at one side and a third cylindrical face at an other side and a plane including an axis of the first cylindrical face and an axis of the third cylindrical face intersects with a plane including an axis of the second cylindrical face and the axis of the third cylindrical face. A light detection device for detecting light is provided, wherein the light detection device includes the optical element as described above and an element for detecting light condensed by the optical element.

19 Claims, 14 Drawing Sheets

BB'

AA'

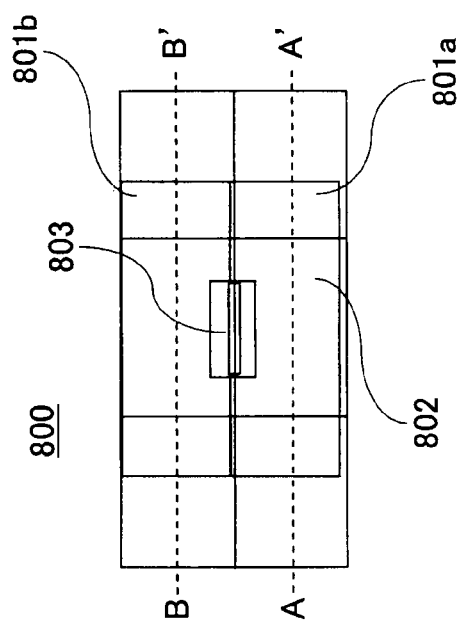
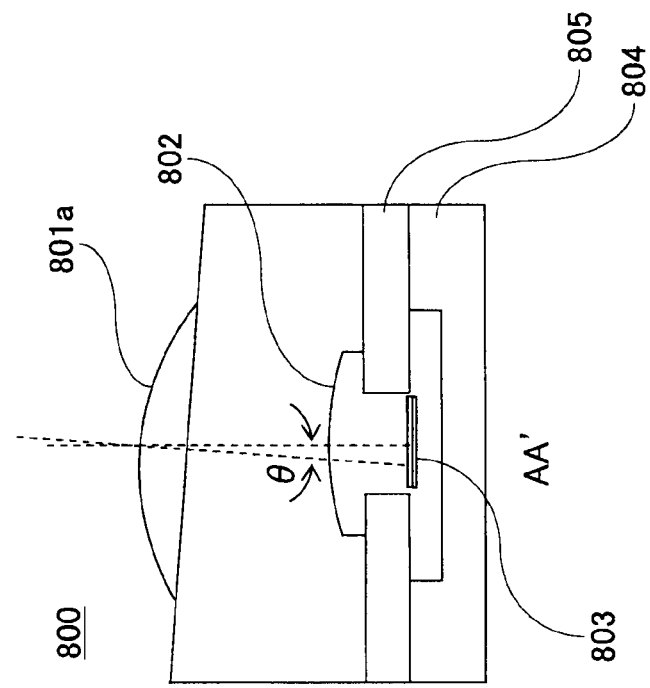
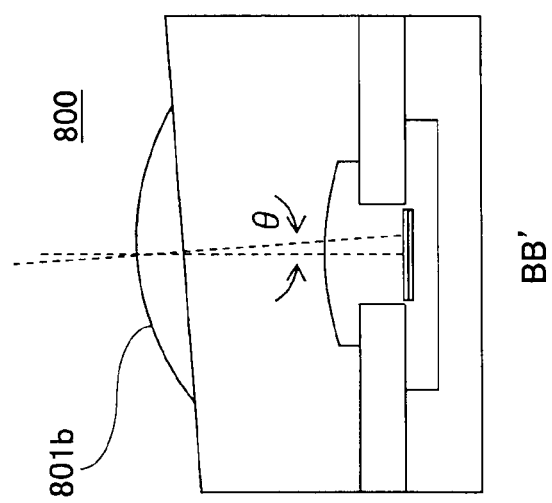
FIG.8A
FIG.8B
FIG.8C

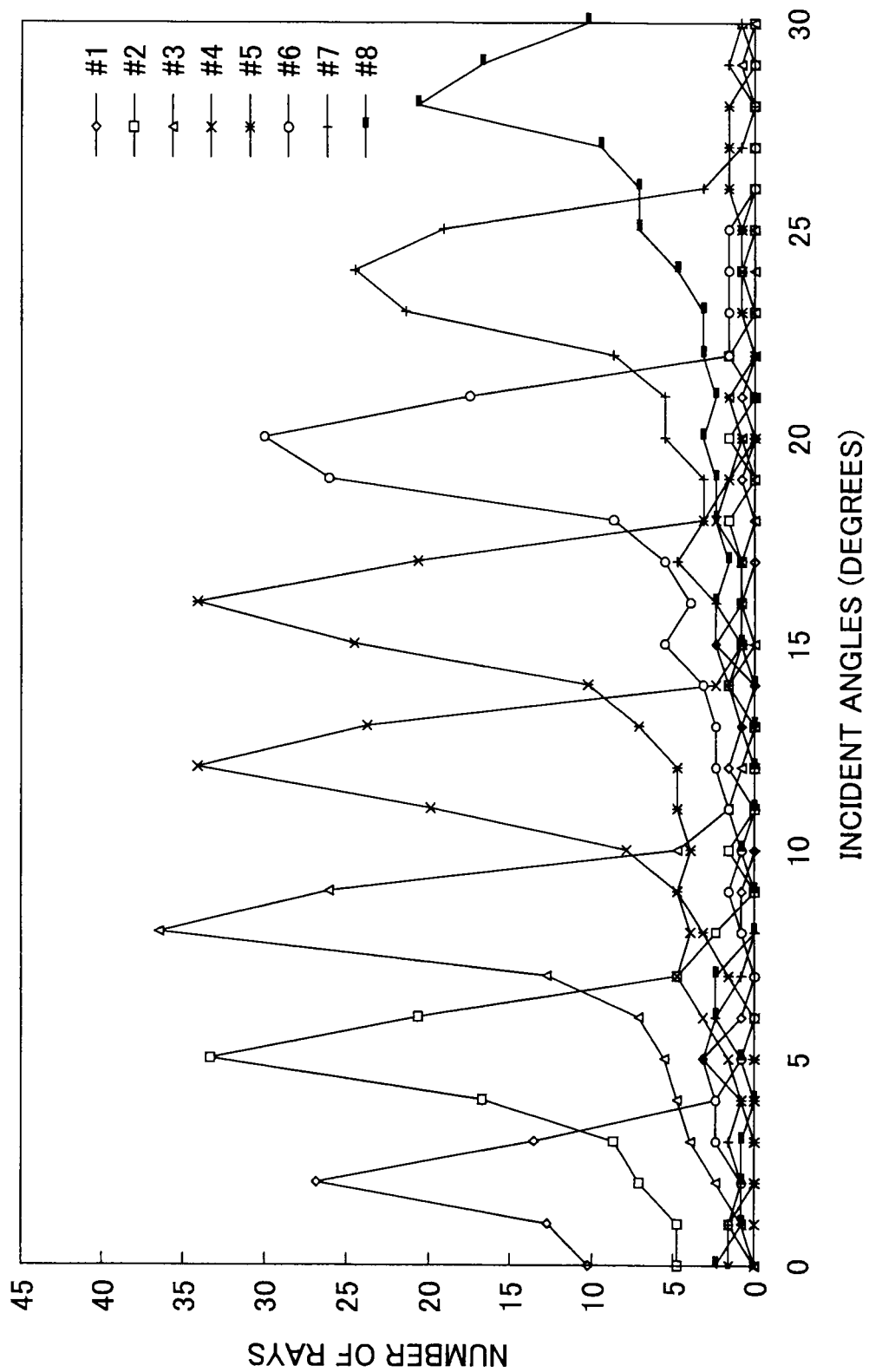

OPTICAL ELEMENT AND A LIGHT DETECTION DEVICE AND AN OBJECT SENSING SYSTEM

BACKGROUND OF THE INVENTION

1. Field of the Invention

At least one aspect of the present invention relates to at least one of an optical element and a light detection device and an object sensing system.

2. Description of the Related Art

Conventionally, some techniques relating to at least one of an optical element and a light detection device and an object sensing system are disclosed.

For example, Japanese Patent Application Publication No. 2008-128913 discloses an infrared ray detection apparatus characterized by including an infrared ray detection element for detecting an infrared ray, a package for storing the infrared ray detection element, a condenser lens arranged in front of the infrared ray detection element and provided for condensing infrared rays on the infrared ray detection element, and an aberration correction optical element arranged in front of the condenser lens and provided for finely controlling the incident angle of an infrared ray onto the condenser lens to correct for an aberration caused in the condenser lens.

However, an optical element capable of condensing light with a broader range of incident angles or a light detection device capable of detecting light with a broader range of incident angles has not been disclosed. An object sensing system capable of sensing existence or displacement of an object based on light with a broader range of incident angles has not been disclosed.

SUMMARY OF THE INVENTION

According to one aspect of the present invention, there is provided an optical element for condensing light, wherein the optical element has a first cylindrical face and a second cylindrical face at one side and a third cylindrical face at an other side and a plane including an axis of the first cylindrical face and an axis of the third cylindrical face intersects with a plane including an axis of the second cylindrical face and the axis of the third cylindrical face.

According to another aspect of the present invention, there is provided a light detection device for detecting light, wherein the light detection device includes the optical element as described above and an element for detecting light condensed by the optical element.

According to another aspect of the present invention, there is provided an object sensing system, including a light detection device for detecting light from an object and a device for sensing existence or displacement of the object based on light detected by the light detection device, wherein the light detection device is the light detection device as described above.

BRIEF DESCRIPTION OF THE DRAWINGS

FIG. 8A, FIG. 8B, and FIG. 8C are diagrams illustrating a structure of a third example of a light detection device according to a second embodiment of the present invention.

FIG. 12A and FIG. 12B are diagrams illustrating an example of a model of a light detection device for a ray trace and a result of its ray trace in a fourth example of a light detection device according to a second embodiment of the present invention.

DETAILED DESCRIPTION OF THE PREFERRED EMBODIMENTS

Next, a mode for implementing the present invention (embodiment) will be described in conjunction with the drawings.

A first object of an embodiment of the present invention is to provide an optical element capable of condensing light with a broader range of incident angles.

A second object of an embodiment of the present invention is to provide a light detection device capable of detecting light with a broader range of incident angles.

A third object of an embodiment of the present invention is to provide an object sensing system capable of sensing existence or displacement of an object based on light with a broader range of incident angles.

A first aspect of an embodiment of the present invention is an optical element for condensing light, characterized in that the optical element has a first cylindrical face and a second cylindrical face at one side and a third cylindrical face at an other side and a plane including an axis of the first cylindrical face and an axis of the third cylindrical face intersects with a plane including an axis of the second cylindrical face and the axis of the third cylindrical face.

A second aspect of an embodiment of the present invention is a light detection device for detecting light, characterized by including the optical element being a first aspect of an embodiment of the present invention and an element for detecting light condensed by the optical element.

A third aspect of an embodiment of the present invention is an object sensing system, including a light detection device for detecting light from an object and a device for sensing existence or displacement of the object based on light detected by the light detection device, characterized in that the light detection device is the light detection device being a second aspect of an embodiment of the present invention.

According to a first aspect of an embodiment of the present invention, it may be possible to provide an optical element capable of condensing light with a broader range of incident angles.

According to a second aspect of an embodiment of the present invention, it may be possible to provide a light detection device capable of detecting light with a broader range of incident angles.

According to a third aspect of an embodiment of the present invention, it may be possible to provide an object sensing system capable of sensing existence or displacement of an object based on light with a broader range of incident angles.

Figure 1A:
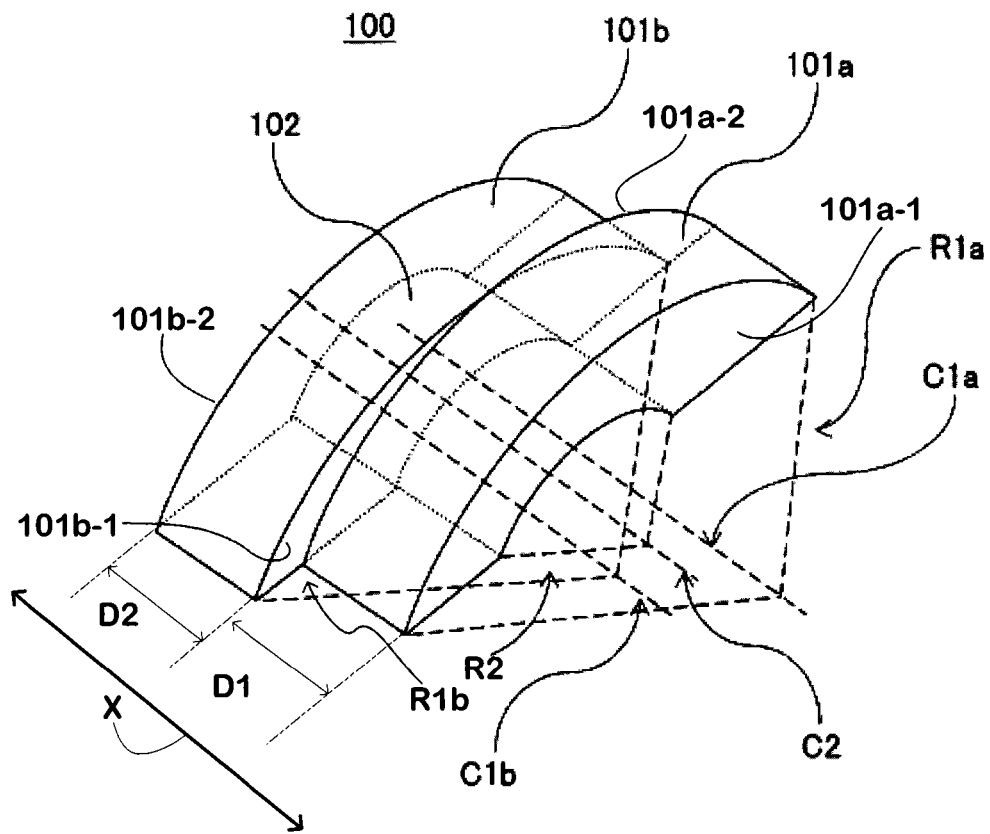
FIG. 1A and FIG. 1B are diagrams illustrating one example of an optical element according to a first embodiment of the present invention.
Figure 1B:
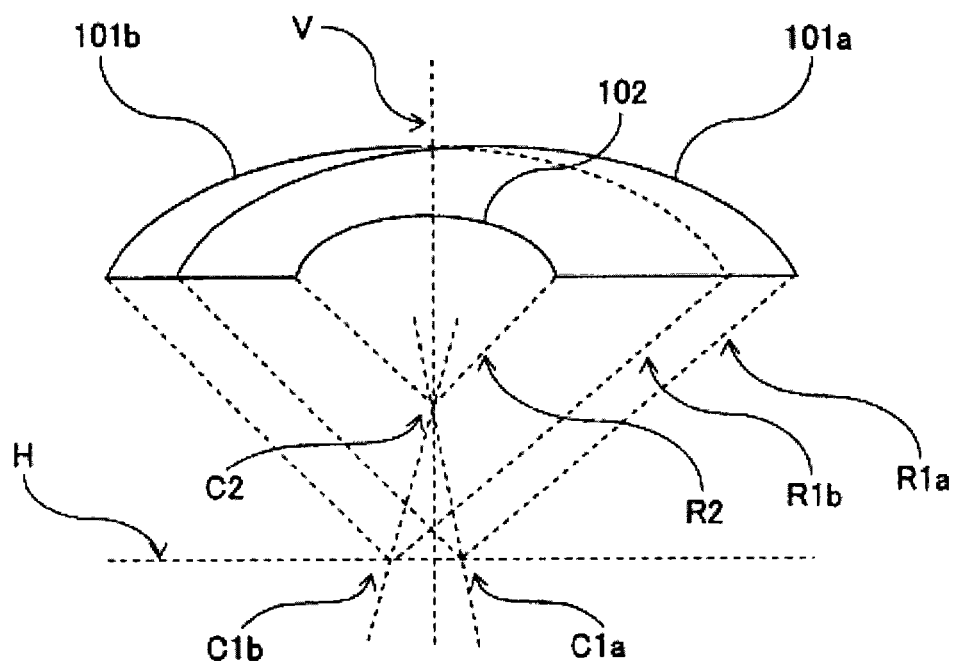

FIG. 1A and FIG. 1B are diagrams illustrating one example of an optical element according to a first embodiment of the present invention. FIG. 1A is a perspective view illustrating one example of an optical element according to a first embodiment of the present invention. FIG. 1B is an elevation view illustrating one example of an optical element according to a first embodiment of the present invention.

One example of an optical element according to a first embodiment of the present invention as illustrated in FIG. 1A and FIG. 1B is an optical element 100 for condensing light, wherein such an optical element is characterized in that the optical element 100 has a first cylindrical face 101a and a second cylindrical face 101b at one side and a third cylindrical face 102 at the other side and a plane including an axis C1a of the first cylindrical face 101a and an axis C2 of the third cylindrical face 102 intersects with a plane including an axis C1b of the second cylindrical face 101b and the axis C2 of the third cylindrical face 102.

As illustrated in FIG 1A, the axis C1a of the first cylindrical face 101a, the axis C1b of the second cylindrical face 101b, and the axis C2 of the third cylindrical face 102, are parallel to a first direction X. The first cylindrical face 101a extends parallel to the first direction X, a first distance D1 from the first end 101a-1 of the first cylindrical face 101a to a second end 101a-2 of the first cylindrical face 101a. The second cylindrical face 101b extends parallel to the first direction X, a second distance D2 from a first end 101b-1 of the second cylindrical face 101b to a second end 101b-2 of the second cylindrical face 101a. The second end 101a-2 of the first cylindrical face 101a is adjacent to the first end 101b-2 of the second cylindrical face 101b in the first direction X.

In the optical element 100, a cylindrical face such as, for example, the first cylindrical face 101a, the second cylindrical face 101b, or the third cylindrical face 102, means at least one portion of a solid face composed of parallel generatrices standing on a perimeter of a face. "parellel" includes completely parallel and a degree regarded as substantially parallel.

In the optical element 100, an axis of a cylindrical face such as, for example, the axis C1a of the first cylindrical face 101a, the axis C1b of the cylindrical face 101b, or the axis C2 of the third cylindrical face 102, means a set of centers of curvature of lines of intersection of a cylindrical face with planes parallel to a bottom face of a cylinder having a cylindrical face, and is a straight line (or line segment). In the optical element 100, a center of curvature of a cylindrical face, such as, for example, a center of curvature of the first cylindrical face 101a, a center of curvature of the second cylindrical face 101b, or a center of curvature of the third cylindrical face 102, is a center of curvature of a line of intersection of a cylindrical face with a plane parallel to a bottom face of a cylinder having a cylindrical face. In the optical element 100, two or three of the axis C1a of the first cylindrical face 101a, the axis C1b of the second cylindrical face 101b, and the axis C2 of the third cylindrical face 102, are not present in an identical or common straight line.

"one side" and "the other side" are, for example, a side of entrance of light onto the optical element 100 and a side of exit of light out of the optical element 100, respectively. The optical element 100 may be arranged in such a manner that, for example, the first cylindrical face 101a and the second cylindrical face 101b are provided at a side of entrance of light onto the optical element 100 and the third cylindrical face 102 is provided at a side of exit of light from the optical element 100.

The optical element 100 has the first cylindrical face 101a and the second cylindrical face 101b at one side and the third cylindrical face 102 at the other side, and a plane including the axis C1a of the first cylindrical face 101a and the axis C2 of the third cylindrical face 102 intersects with a plane including the axis C1b of the second cylindrical face 101b and the axis C2 of the third cylindrical face 102.

A plane including the axis C1a of the first cylindrical face 101a and the axis C2 of the third cylindrical face 102 intersecting with a plane including the axis C1b of the second cylindrical face 101b and the axis C2 of the third cylindrical face 102 means that all of the axis C1a of the first cylindrical face 101a, the axis C1b of the second cylindrical face 101b, and the axis C2 of the third cylindrical face 102, are not present in an identical or common plane. (The axis C1a of) The first cylindrical face 101a and (the axis C1b of) the second cylindrical face 101b are translated (shifted) or rotated toward directions opposite to each other with respect to (the axis C2 of) the third cylindrical face 102.

When the first cylindrical face 101a and the second cylindrical face 101b are provided at a side of entrance of light onto the optical element 100 and the third cylindrical face 102 is provided at a side of exit of light from the optical element 100, it may be possible for light with a broader range of incident angles to enter the first cylindrical face 101a and the second cylindrical face 101b and exit from the third cylindrical face 102. It may be possible to divide light with a broader range of incident angles through the first cylindrical face 101a and the second cylindrical face 101b and the third cylindrical face 102 at a higher resolution.

According to a first embodiment of the present invention, it may be possible to provide the optical element 100 capable of condensing light with a broader range of incident angles. According to a first embodiment of the present invention, it may be possible to provide the optical element 100 capable of condensing light at a higher angular resolution.

A cylindrical face such as the first cylindrical face 101a, the second cylindrical face 101b, or the third cylindrical face 102, in the optical element 100, may be formed by a molding technique using a mold corresponding to a shape of a cylindrical face. When a material of the optical element 100 is a semiconductor material, a cylindrical face such as the first cylindrical face 101a, the second cylindrical face 101b, or the third cylindrical face 102, in the optical element 100, may be formed by using an etching technique for removing a part of a semiconductor wafer.

An optical element as illustrated in FIG. 1A and FIG. 1B is, for example, capable of being utilized as an optical element included in an infrared light detection device for detecting infrared light from a heat source such as a human body in a house, an office or a car. The optical element 100 as illustrated in FIG. 1A and FIG. 1B is, for example, capable of being utilized as an optical element included in a temperature control device in an air-conditioner, an electromagnetic cooking utensil, or a personal computer or an energy management device for electric power saving.

In the optical element 100, a distance between the axis C1a of the first cylindrical face 101a and the axis C2 of the third cylindrical face 102 is identical to a distance between the axis C1b of the second cylindrical face 101b and the axis C2 of the third cylindrical face 102.

"identical" includes completely identical and a degree regarded as substantially identical.

In the optical element 100, a distance between axes of cylindrical faces such as a distance between the axis C1a of the first cylindrical face 101a and the axis C2 of the third cylindrical face 102 or a distance between the axis C1b of the second cylindrical face 101b and the axis C2 of the third cylindrical face 102 is an average of distances between an axis of one cylindrical face and an axis of the other cylindrical face. A distance between an axis of one cylindrical face and an axis of the other cylindrical face is a distance between a point on an axis of one cylindrical face and a point at an intersection of a line perpendicular to an axis of one cylindrical face at a point on an axis of one cylindrical face with an axis of the other cylindrical face. In the optical element 100, each of a distance between the axis C1a of the first cylindrical face 101a and the axis C2 of the third cylindrical face 102 and a distance between the axis C1b of the second cylindrical face 101b and the axis C2 of the third cylindrical face 102 is a value greater than zero.

When a distance between the axis C1a of the first cylindrical face 101a and the axis C2 of the third cylindrical face 102 is identical to a distance between the axis C1b of the second cylindrical face 101b and the axis C2 of the third cylindrical face 102, it may be possible to provide the optical element 100 capable of designing an arrangement of the first cylindrical face 101a and the second cylindrical face 101b with respect to the third cylindrical face 102 more easily. It may be possible to provide the optical element 100 capable of being designed more easily and capable of condensing light with a broader range of incident angles. It may be possible to provide the optical element 100 capable of being designed more easily and capable of condensing light at a higher angular resolution.

In the optical element 100, preferably, a radius of curvature R1a of the first cylindrical face 101a is identical to a radius of curvature R1b of the second cylindrical face 101b.

"identical" includes completely identical and a degree regarded as substantially identical.

In the optical element 100, for example, a radius of curvature of a cylindrical face such as the radius of curvature R1a of the first cylindrical face 101a or the radius of curvature R1b of the second cylindrical face 101b is a radius of curvature of a line of intersection of a cylindrical face with a plane parallel to a bottom face of a cylinder having a cylindrical face.

When the radius of curvature R1a of the first cylindrical face 101a is identical to the radius of curvature R1b of the second cylindrical face 101b, it may be possible to provide the optical element 100 capable of designing an arrangement of the first cylindrical face 101a and the second cylindrical face 101b with respect to the third cylindrical face 102 more easily. It may be possible to provide the optical element 100 capable of being designed more easily and capable of condensing light with a broader range of incident angles. It may be possible to provide the optical element 100 capable of being designed more easily and capable of condensing light at a higher angular resolution.

In the optical element 100, preferably, the first cylindrical face 101a and the second cylindrical face 101b are convex faces and the third cylindrical face 102 is a concave face. The first cylindrical face 101a and the second cylindrical face 101b are convex faces when viewing from the first cylindrical face 101a and the second cylindrical face 101b to the third cylindrical face 102. The third cylindrical face 102 is a concave face when viewing from the third cylindrical face 102 to the first cylindrical face 101a and the second cylindrical face 101b. The first cylindrical face 101a and the second cylindrical face 101b have positive powers and the third cylindrical face 102 has a negative power.

When the first cylindrical face 101a and the second cylindrical face 101b are convex faces and the third cylindrical face 102 is a concave face, it may be possible to provide the optical element 100 capable of condensing light with a broader range of incident angles more efficiently. It may be possible to provide the optical element 100 capable of condensing light at a higher angular resolution more efficiently.

In the optical element 100, preferably, the optical element 100 is formed of a material transparent to an infrared ray.

An infrared ray includes a near-infrared ray or very-near-infrared ray (an electromagnetic wave with a wavelength greater than or equal to 0.75 μm and less than or equal to 2 μm), a normal infrared ray (an electromagnetic wave with a wavelength greater than or equal to 2 μm and less than or equal to 60 μm), a mid-infrared ray (an electromagnetic wave with a wavelength greater than or equal to 2 μm and less than or equal to 20 μm), a mid-far-infrared ray (an electromagnetic wave with a wavelength greater than or equal to 25 μm and less than or equal to 60 μm), and a far-infrared ray (an electromagnetic wave with a wavelength greater than or equal to 25 μm and less than or equal to 5000 μm).

For a material transparent to an infrared ray, there is provided, for example, silicon (Si), germanium (Ge), or the like.

When the optical element 100 is formed of a material transparent to an infrared ray, it may be possible to provide the optical element 100 capable of condensing an infrared light with a broader range of incident angles. It may be possible to provide the optical element 100 capable of condensing an infrared light at a higher angular resolution.

In the optical element 100, preferably, an infrared ray is a far-infrared ray. When an infrared ray for the optical element 100 is a far-infrared ray, it may be possible to provide the optical element 100 capable of condensing a far-infrared ray with a broader range of incident angles which is radiated from an object at a comparatively low temperature. It may be possible to provide the optical element 100 capable of condensing a far-infrared ray radiated from an object at a comparatively low temperature at a higher angular resolution.

In the optical element 100, preferably, a material transparent to an infrared ray is a semiconductor material.

For a material transparent to an infrared ray which is a semiconductor material, there is, for example, silicon (Si) or the like.

When a material transparent to an infrared ray is a semiconductor material, it may be possible to manufacture the optical element 100 more easily by using a semiconductor process. It may be possible to provide the optical element 100 capable of being manufactured more easily and capable of condensing an infrared light with a broader range of incident angles. It may be possible to provide the optical element 100 capable of being manufactured more easily and capable of condensing an infrared light at a higher angular resolution.

In the optical element 100, preferably, the first cylindrical face 101a and the second cylindrical face 101b have identical or common shapes.

"identical" or "common" includes completely identical or common and a degree regarded as substantially identical or common.

When the first cylindrical face 101a and the second cylindrical face 101b have identical or common shapes, it may be possible to provide the optical element 100 capable of being manufactured more easily and capable of condensing light with a broader range of incident angles. It may be possible to provide the optical element 100 capable of being manufactured more easily and capable of condensing light at a higher angular resolution.

In the optical element 100, preferably, the first cylindrical face 101a and the second cylindrical face 101b are circular cylindrical faces.

A circular cylindrical face means at least one portion of a solid face composed of parallel generatrices standing on a perimeter of a circle.

When the first cylindrical face 101a and the second cylindrical face 101b are circular cylindrical faces, it may be possible to provide the optical element 100 capable of condensing light with a broader range of incident angles more easily. It may be possible to provide the optical element 100 capable of condensing light at a higher angular resolution more easily.

In the optical element 100, preferably, the first cylindrical face 101a and the second cylindrical face 101b are non-circular cylindrical faces.

A non-circular cylindrical face means at least one portion of a solid face composed of parallel generatrices standing on a perimeter of a face having a shape other than a circle. For a non-circular cylindrical face, there is provided, for example, a cylindrical face in which a line of intersection of a plane parallel to a bottom face of a cylinder having a cylindrical face with such a cylindrical face is a Gaussian curve, or the like.

Figure 2:
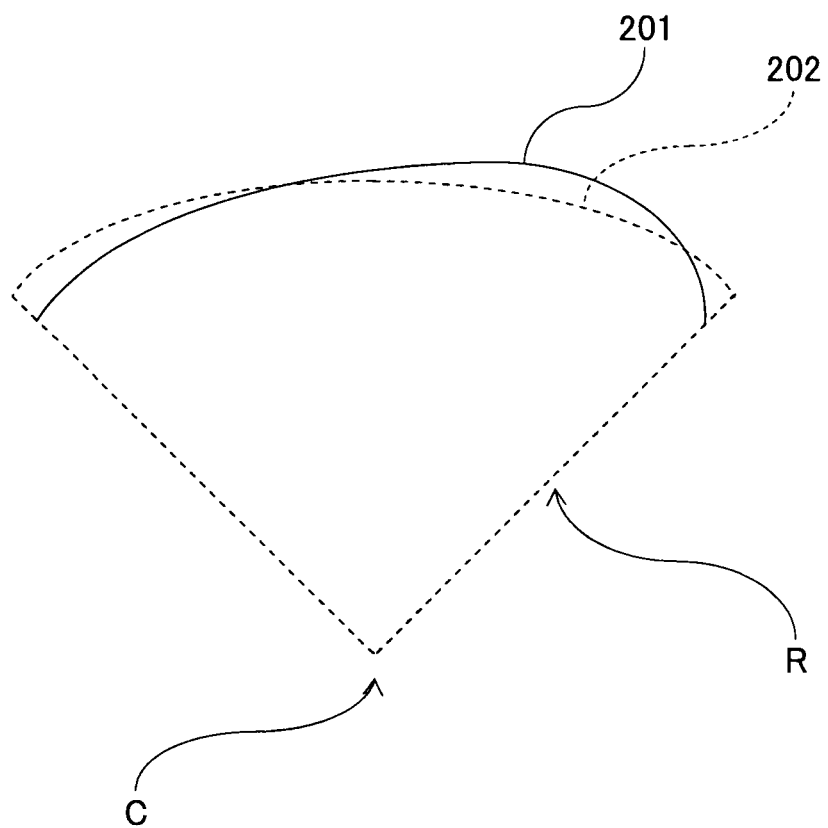
FIG. 2 is a diagram illustrating another example of an optical element according to a first embodiment of the present invention.

FIG. 2 is a diagram illustrating another example of an optical element according to a first embodiment of the present invention. In an optical element as illustrated in FIG. 2, a first and second cylindrical faces 201 are non-circular cylindrical faces.

When the first and second cylindrical faces 201 are non-circular cylindrical faces as illustrated in FIG. 2, a center of curvature of a line of intersection of a cylindrical face with a plane parallel to a bottom face of a cylinder having a cylindrical face is a center of curvature C of an arc 202 which best approximates a line of intersection of a cylindrical face with a plane parallel to a bottom face of a solid having a cylindrical face. A radius of curvature of a line of intersection of a cylindrical face with a plane parallel to a bottom face of a cylinder having a cylindrical face is a radius of curvature R of the arc 202 which best approximates a line of intersection of a cylindrical face with a plane parallel to a bottom face of a cylinder having a cylindrical face. It may be possible to obtain the arc 202 which best approximates a line of intersection of a cylindrical face with a plane parallel to a bottom face of a cylinder having a cylindrical face, by means of approximation of an arc for a design value of the first or second cylindrical faces 201 being a non-circular cylindrical face or a line of intersection of a cylindrical face with a plane parallel to a bottom face of a cylinder having a cylindrical face based on a least-square method.

When the first cylindrical face 101a and the second cylindrical face 101b are non-circular cylindrical faces, a shape of the first cylindrical face 101a or the second cylindrical face 101b being a non-circular cylindrical face is adjusted whereby it may be possible to reduce aberration of light condensed by the optical element 100. It may be possible to provide the optical element 100 capable of condensing light with a broader range of incident angles and capable of reducing aberration of condensed light. It may be possible to provide the optical element 100 capable of condensing light at a higher angular resolution and capable of reducing aberration of condensed light.

In the optical element 100, preferably, the first cylindrical face 101a and the second cylindrical face 101b are perpendicular to a plane H including the axis C1a of the first cylindrical face 101a and the axis C1b of the second cylindrical face 101b and have symmetric shapes with respect to a plane V including the axis C2 of the third cylindrical face 102.

"symmetric" includes completely symmetric and a degree regarded as substantially symmetric.

When the first cylindrical face 101a and the second cylindrical face 101b are perpendicular to the plane H including the axis C1a of the first cylindrical face 101a and the axis C1b of the second cylindrical face 101b and have symmetric shapes with respect to the plane V including the axis C2 of the third cylindrical face 102, it may be possible to provide the optical element 100 capable of being designed or manufactured more easily and capable of condensing light with a broader range of incident angles. It may be possible to provide the optical element 100 capable of being designed or manufactured more easily and capable of condensing light at a higher angular resolution.

In the optical element 100, preferably, the optical element 100 has a first plane provided with the first cylindrical face 101a and a second plane provided with the second cylindrical face 101b and a first plane and a second plane are planes inclined with respect to the plane H including the axis C1a of the first cylindrical face 101a and the axis C1b of the second cylindrical face 101b.

A plane such as a first plane or a second plane includes a complete plane and a curved face or convex or concave face regarded as a substantial plane. A first plane and a second plane being planes inclined with respect to the plane H including the axis C1a of the first cylindrical face 101a and the axis C1b of the second cylindrical face 101b means that angles of a first plane and a second plane with respect to the plane H including the axis C1a of the first cylindrical face 101a and the axis C1b of the second cylindrical face 101b are angles greater than 0 degrees and less than 90 degrees.

When the optical element 100 has a first plane provided with the first cylindrical face 101a and a second plane provided with the second cylindrical face 101b and a first plane and a second plane are planes inclined with respect to the plane H including the axis C1a of the first cylindrical face 101a and the axis C1b of the second cylindrical face 101b, it may be possible to provide the optical element 100 capable of being designed more easily and capable of condensing light with a broader range of incident angles. It may be possible to provide the optical element 100 capable of being designed more easily and capable of condensing light at a higher angular resolution.

In the optical element 100, preferably, a first plane and a second plane have symmetric shapes with respect to the plane V which is perpendicular to the plane H including the axis C1a of the first cylindrical face 101a and the axis C1b of the second cylindrical face 101b and includes the axis C2 of the third cylindrical face 102.

"symmetric" includes completely symmetric and a degree regarded as substantially symmetric.

When a first plane and a second plane have symmetric shapes with respect to the plane V which is perpendicular to the plane H including the axis C1a of the first cylindrical face 101a and the axis C1b of the second cylindrical face 101b and includes the axis C2 of the third cylindrical face 102, it may be possible to provide the optical element 100 capable of being manufactured more easily and capable of condensing light with a broader range of incident angles. It may be possible to provide the optical element 100 capable of being manufactured more easily and capable of condensing light at a higher angular resolution.

In the optical element 100, preferably, a maximum value of a length of the optical element 100 in a direction perpendicular to the plane H including the axis C1a of the first cylindrical face 101a and the axis C1b of the second cylindrical face 101b is less than or equal to 1 mm.

When a maximum value of a length of the optical element 100 in a direction perpendicular to the plane H including the axis C1a of the first cylindrical face 101a and the axis C1b of the second cylindrical face 101b is less than or equal to 1 mm, it may be possible to provide the optical element 100 being capable of condensing light with a broader range of incident angles and being more compact. It may be possible to provide the optical element 100 being capable of condensing light at a higher angular resolution and being more compact.

In the optical element 100, preferably, the first cylindrical face 101a and the second cylindrical face 101b have Fresnel lens shapes.

A Fresnel lens shape is a shape obtained by dividing the first cylindrical face 101a (or the second cylindrical face 101b) being a continuous curved face by plural lines parallel to the axis C1a of the first cylindrical face 101a (or the axis C1b of the second cylindrical face 101b) and reducing a distance(s) (or thickness) from a surface of the first cylindrical face 101a (or the second cylindrical face 101b) at an opposite side to a divided part(s) of the first cylindrical face 101a (or the second cylindrical face 101b). A Fresnel lens shape is a shape including plural cylindrical faces with a curvature of a portion of the first cylindrical face 101a (or the second cylindrical face 101b). A Fresnel lens shape is a sawtooth shape with a curvature of a portion of the first cylindrical face 101a (or the second cylindrical face 101b) in a cross-section perpendicular to the axis C1a of the first cylindrical face 101a (or the axis C1b of the second cylindrical face 101b). "parallel" includes completely parallel and a degree regarded as substantially parallel. "perpendicular" includes completely perpendicular and a degree regarded as substantially perpendicular.

Figure 11:
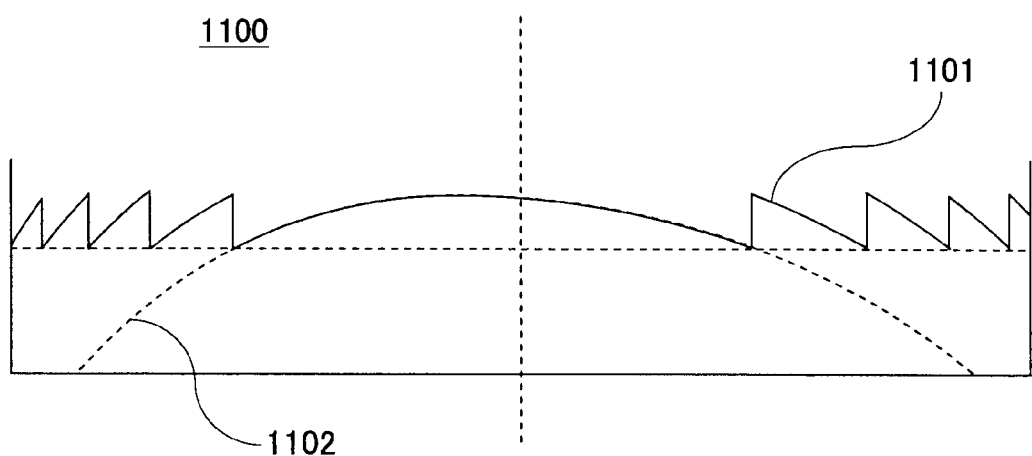
FIG. 11 is a diagram illustrating yet another example of an optical element according to a first embodiment of the present invention.

FIG. 11 is a diagram illustrating yet another example of an optical element according to a first embodiment of the preset invention. An optical element 1100 as illustrated in FIG. 11 has a first or second cylindrical face 1101 having a Fresnel lens shape. A Fresnel lens shape of a first cylindrical face or second cylindrical face as illustrated by curved lines and a solid and straight line connecting curved lines in FIG. 11 is a shape obtained by dividing a cylindrical face 1102 having a shape of a single convex curved face as illustrated by a dotted line in FIG. 11 by plural lines parallel to an axis of a first cylindrical face or second cylindrical face and reducing a distance (or thickness) from a surface of a first cylindrical face or second cylindrical face at an opposite side to a divided portion of a first cylindrical face or second cylindrical face. A Fresnel lens shape of a first cylindrical face or second cylindrical face is a shape including plural cylindrical faces with a curvature of a portion of a first cylindrical face or second cylindrical face. A Fresnel lens shape of a first cylindrical face or second cylindrical face is a saw-tooth shape with a curvature of a portion of a first cylindrical face or second cylindrical face in a cross-section perpendicular to an axis of a first cylindrical face or second cylindrical face. The cylindrical face 1102 having a shape of a single curved face is a non-circular cylindrical face which is asymmetric with respect to a plane perpendicular to an axis of a third cylindrical face as illustrated by a longitudinal dotted and straight line in FIG. 11. A Fresnel lens shape of a first cylindrical face or second cylindrical face is a non-circular cylindrical face which is asymmetric with respect to a plane perpendicular to an axis of a third cylindrical face as illustrated in a longitudinal dotted and straight line in FIG. 11. A thickness of a Fresnel lens shape (a maximum thickness of a first cylindrical face or second cylindrical face in a direction perpendicular to a plane including an axis of a cylindrical face and an axis of a second cylindrical face: amount of sag) is appropriately determined depending on a condition of designing or manufacturing of an optical element and is not particularly limited.

When the first cylindrical face 101a and the second cylindrical face 101b in the optical element 100 have Fresnel lens shapes, it may be possible to reduce a maximum thickness of the first cylindrical face 101a or the second cylindrical face 101b in a direction perpendicular to a plane including the axis C1a of the first cylindrical face 101a and the axis C1b of the second cylindrical face 101b (amount of sag). When it may be possible to reduce a maximum thickness of the first cylindrical face 101a or the second cylindrical face 101b in a direction perpendicular to a plane including the axis C1a of the first cylindrical face 101a and the axis C1b of the second cylindrical face 101b (amount of sag), it may be possible to, for example, reduce a thickness of a resist layer provided on a wafer when the optical element 100 is manufactured in such a manner that a concavo-convex shape is formed on a semiconductor wafer by means of etching using a resist. When it may be possible to reduce a thickness of a resist layer provided on a wafer, it may be possible to improve a yield or productivity of the optical element 100 by reducing the number of an air bubble(s) or crack(s) which may be produced or a dispersion of a thickness of a resist layer.

When it may be possible to reduce a maximum thickness of the first cylindrical face 101a or the second cylindrical face 101b in a direction perpendicular to a plane including the axis C1a of the first cylindrical face 101a and the axis C1b of the second cylindrical face 101b (amount of sag), it may be possible to, for example, reduce damage of the optical element 100 pressed in a pressing process when a wafer for forming an optical element and a wafer for forming an element for detecting light condensed by the optical element 100 included in a light detection device are bonded to each other.

Even when the first cylindrical face 101a and the second cylindrical face 101b in the optical element 100 have Fresnel lens shapes, it may be possible to provide the optical element 100 capable of condensing light with a broader range of incident angles. Even when the first cylindrical face 101a and the second cylindrical face 101b in the optical element 100 have Fresnel lens shapes, it may be possible to provide the optical element 100 capable of condensing light at a higher angular resolution.

Figure 3:
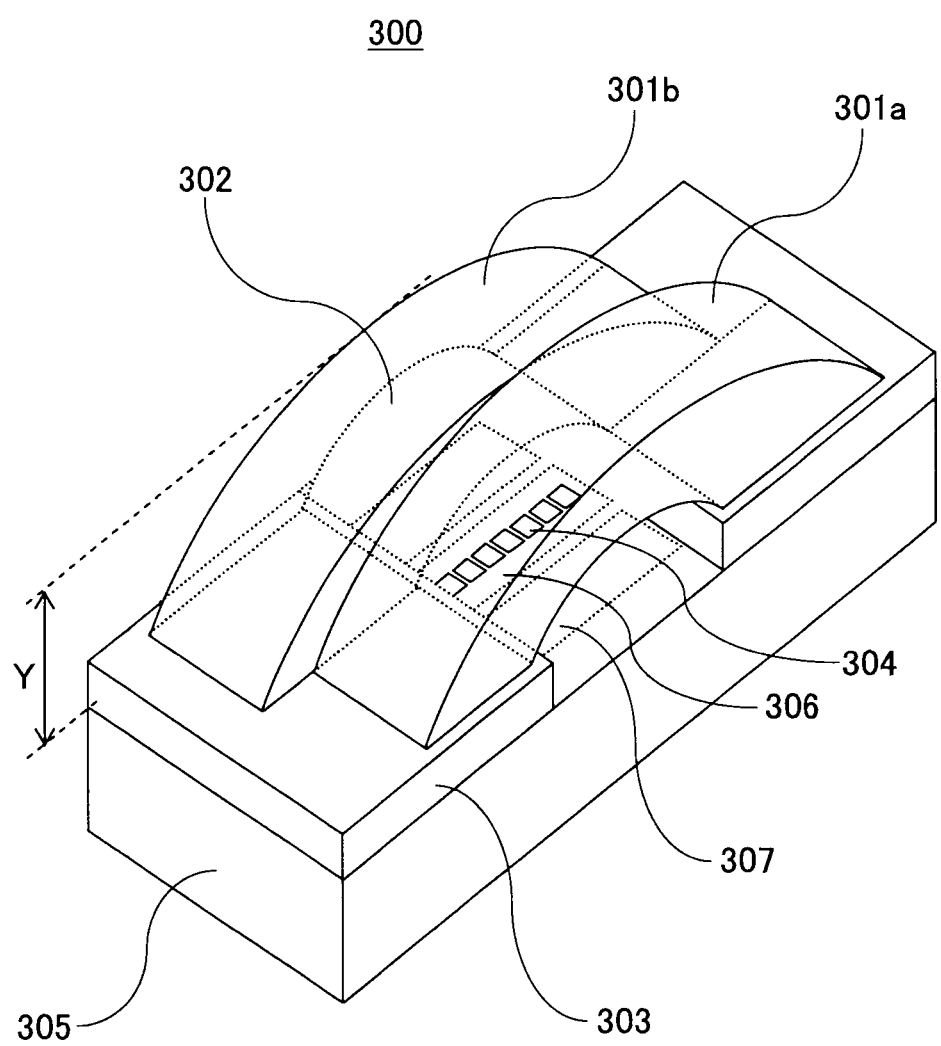
FIG. 3 is a diagram illustrating a general structure of a first example of a light detection device according to a second embodiment of the present invention.

FIG. 3 is a diagram illustrating a general structure of a first example of a light detection device according to a second embodiment of the present invention.

A first example of a light detection device according to a second embodiment of the present invention as illustrated in FIG. 3 is a light detection device 300 for detecting light, wherein a light detection device is characterized by including an optical element according to a first embodiment of the present invention and an element 304 for detecting light condensed by an optical element.

The light detection device 300 as illustrated in FIG. 3 includes an optical element according to a first embodiment of the present invention as illustrated in FIG. 1A and FIG. 1B and the element (optical sensor) 304 for detecting light condensed by an optical element.

An optical element as illustrated in FIG. 3 has a first cylindrical face 301a and a second cylindrical face 301b at one side and a third cylindrical face 302 at the other side and a plane including an axis of the first cylindrical face 301a and an axis of the third cylindrical face 302 intersects with a plane including an axis of the second cylindrical face 301b and an axis of the third cylindrical face 302. An optical element as illustrated in FIG. 3 further includes a support substrate 303 for supporting a part having the first cylindrical face 301a, the second cylindrical face 301b, and the third cylindrical face 302 (a substrate to be provided with a part having the first cylindrical face 301a, the second cylindrical face 301b, and the third cylindrical face 302) in addition to the first cylindrical face 301a, the second cylindrical face 301b, and the third cylindrical face 302. In an optical element as illustrated in FIG. 3, (a maximum value of) a length Y of an optical element in a direction perpendicular to a plane including an axis of the first cylindrical face 301a and an axis of the second cylindrical face 301b as illustrated in FIG. 1A and FIG. 1B is less than or equal to 1 mm. In an optical element as illustrated in FIG. 3, (a maximum value of) the length Y of an optical element in a direction perpendicular to a plane including an axis of the first cylindrical face 301a and an axis of the second cylindrical face 301b is a distance from a straight line on a top of the first cylindrical face 301a or the second cylindrical face 301b to a plane of the support substrate 303 at a side of a circuit board 305.

The optical sensor 304 receives light condensed by an optical element and converts received light into an electric signal, and thereby, light condensed by an optical element is detected. The optical sensor 304 includes a light receiving surface (pixel) for receiving light condensed by an optical element and a circuit (sensor circuit) for converting light received by a light receiving surface into an electric signal. For example, when light condensed by an optical element is infrared light, a light receiving surface is a layer (infrared ray absorption layer) which absorbs and converts infrared light condensed by an optical element into heat and a sensor circuit is an element for converting heat converted by a light receiving surface into an electric signal. The optical sensor 304 may be provided on a cavity structure 306 formed on the circuit board 305. The optical sensor 304 outputs a signal (electric signal) related to light detected by the optical sensor 304. For a material of the circuit board 305, there is provided, for example, a ceramic board or the like.

The optical device 300 as illustrated in FIG. 3 may further include a circuit part 307 which includes a signal amplification circuit for amplifying a signal output from the optical sensor 304 and a signal processing circuit for processing a signal amplified by a signal amplification circuit. The circuit part 307 is provided on the circuit board 305. For example, when light condensed by an optical element is infrared light, a signal amplification circuit included in the circuit part 307 may be a circuit for amplifying an electric signal output from an optical sensor for infrared light detected by the optical sensor 304 and a signal processing circuit included in the circuit part 307 may be a circuit for obtaining information of an incident angle of infrared light incident on an optical element or presence or absence or a direction of a heat source for generating infrared light incident on an optical element (or light source), from a signal amplified by a signal amplification circuit.

In the light detection device 300 as illustrated in FIG. 3, the optical sensor 304 and the circuit part 307 provided on the cavity structure 306 are provided adjacent to the circuit board 305, and therefore, it may be possible to provide a more compact light detection device 300.

The light detection device 300 according to a second embodiment of the present invention includes an optical element according to a first embodiment of the present invention, and therefore, it may be possible for light with a broader range of incident angles to enter the first cylindrical face 301a and the second cylindrical face 301b and exit from the third cylindrical face 302. It may be possible to divide light with a broader range of incident angles through the first cylindrical face 301a and the second cylindrical face 301b and the third cylindrical face 302 at a higher resolution.

According to a second embodiment of the present invention, it may be possible to provide the light detection device 300 capable of detecting light with a broader range of incident angles. According to a second embodiment of the present invention, it may be possible to provide the light detection device 300 capable of detecting light at a higher angular resolution.

The light detection device 300 as illustrated in FIG. 3 is capable of being utilized as, for example, an infrared light detection device for detecting infrared light from a heat source such as a human body in a house, an office, or a car or the like. The light detection device 300 as illustrated in FIG. 3 is capable of being utilized as, for example, a temperature control device in an air-conditioner, an electromagnetic cooking utensil, or a personal computer or an energy management device for electric power saving.

In the light detection device 300, preferably, an optical element and a light detecting element are formed of a semiconductor material.

For a semiconductor material, there is provided, for example, silicon (Si) or the like.

When an optical element and a light detecting element are formed of a semiconductor material, it may be possible to manufacture the light detection device 300 more easily by using a semiconductor process. It may be possible to provide the light detection device 300 capable of being manufactured more easily and capable of detecting light with a broader range of incident angles. According to a second embodiment of the present invention, it may be possible to provide the light detection device 300 capable of being manufactured more easily and capable of detecting light at a higher angular resolution.

Figure 4A:
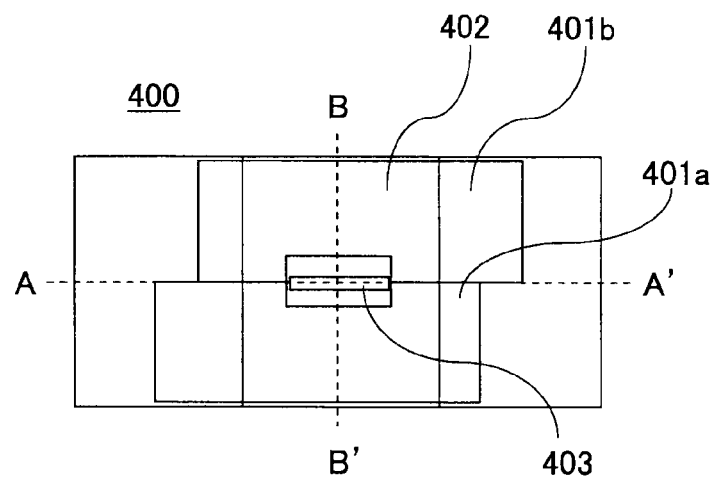
FIG. 4A, FIG. 4B, and FIG. 4C are diagrams illustrating a more detailed structure of a first example of a light detection device according to a second embodiment of the present invention.
Figure 4C:
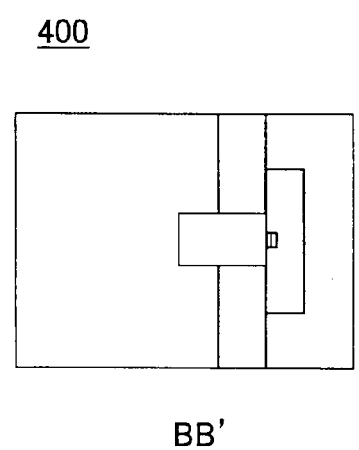
Figure 4B:
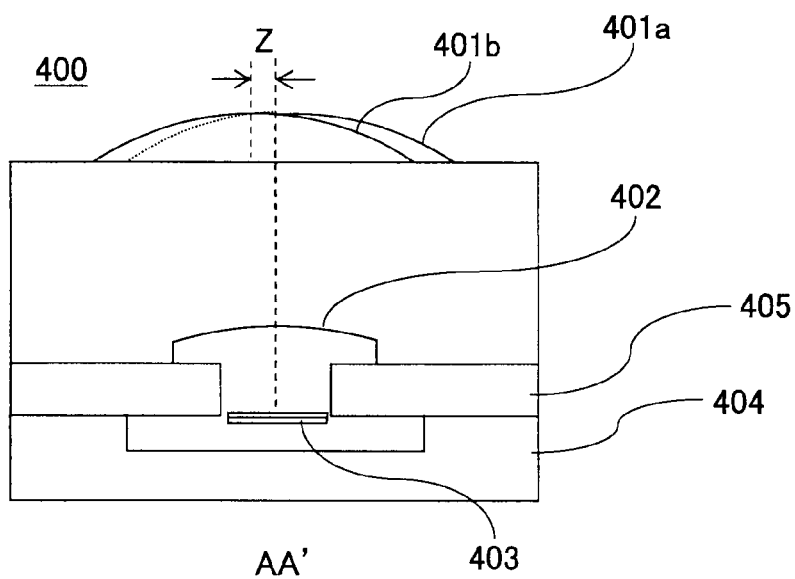

FIG. 4A, FIG. 4B, and FIG. 4C are diagrams illustrating a more detailed structure of a first example of a light detection device according to a second embodiment of the present invention. FIG. 4A is a plan view of a first example of a light detection device according to a second embodiment of the present invention. FIG. 4B is a cross-sectional view of a first example of a light detection device according to a second embodiment of the preset invention in direction of AA'. FIG. 4C is a cross-sectional view of a first example of a light detection device according to a second embodiment of the present invention in a direction of BB'.

A first example of a light detection device according to a second embodiment of the present invention as illustrated in FIG. 4A, FIG. 4B, and FIG. 4C is an infrared light sensor 400 similar to a light detection device 300 according to a second embodiment of the present invention as illustrated in FIG. 3. The infrared light sensor 400 as illustrated in FIG. 4A, FIG. 4B, and FIG. 4C is an infrared light device for detecting infrared light and includes an infrared ray condensing element as an optical element according to a first embodiment of the present invention and a sensor circuit 403 as an element for detecting infrared light condensed by an infrared ray condensing element. The sensor circuit 403 is held by a circuit board 404. The sensor circuit 403 has plural infrared ray receiving surfaces (pixels) which are arranged one-dimensionally and receive infrared light, and converts an infrared light received by an infrared ray receiving surface into an electric signal. The infrared light sensor 400 includes a signal amplification circuit for amplifying an electric signal output from the sensor circuit 403 and a signal processing circuit for obtaining information of presence or absence or a direction of a heat source from an output of a signal amplification circuit.

An infrared ray condensing element included in the infrared light sensor 400 is an optical element for condensing infrared light. An infrared ray condensing element condenses infrared light radiated from a heat source onto an infrared ray receiving surface (pixel) of the sensor circuit 403 depending on an incident angle of an infrared light ray.

An infrared ray condensing element is formed of a semiconductor material transparent to an infrared ray, such as silicon (Si) or germanium (Ge). Silicon (Si) is a material transparent to infrared light with a wavelength of about 10 μm. For a material transparent to infrared light, preferably, silicon (Si) is used. When silicon (Si) is used as a material transparent to infrared light, not only may it be possible to form an infrared ray condensing element of silicon (Si) but it may also be possible to form the sensor circuit 403, a signal amplification circuit, and a signal processing circuit by using a CMOS process technique.

An infrared ray condensing element has a first cylindrical face 401a and a second cylindrical face 401b at a side of entrance of an infrared ray and a third cylindrical face 402 at a side of exit of an infrared ray. The first cylindrical face 401a and the second cylindrical face 401b are convex and circular cylindrical faces having identical or common shapes and the third cylindrical face 402 is a concave and circular cylindrical face. A plane including an axis of the first cylindrical face 401a and an axis of the third cylindrical face 402 intersects with a plane including an axis of the second cylindrical face 401b and an axis of the third cylindrical face 402. A distance between an axis of the first cylindrical face 401a and an axis of the third cylindrical face 402 is identical to a distance between an axis of the second cylindrical face 401b and an axis of the third cylindrical face 402. A radius of curvature of the first cylindrical face 401a is identical to a radius of curvature of the second cylindrical face 401b. The first cylindrical face 401a and the second cylindrical face 401b have symmetric shapes with respect to a plane which is perpendicular to a plane including an axis of the first cylindrical face 401a and an axis of the second cylindrical face 401b and includes an axis of the third cylindrical face 402. (An axis of) The first cylindrical face 401a and (an axis of) the second cylindrical face 401b are shifted by a predetermined amount Z with respect to a plane which is perpendicular to a plane including an axis of the first cylindrical face 401a and an axis of the second cylindrical face 401b and includes an axis of the third cylindrical face 402.

In the infrared light sensor 400, a direction of the axis of first cylindrical face 401a or the axis of second cylindrical face 401b (a direction parallel to BB') is a direction orthogonal to a direction of arrangement of light receiving surfaces (pixels) of the sensor circuit 403 arranged one-dimensionally (a parallel to AA'). The first cylindrical face 401a and the second cylindrical face 401b are mutually shifted in a direction of arrangement of one-dimensionally arranged light receiving surfaces (pixels) of the sensor circuit 403 (a direction parallel to AA'). A distance between the third cylindrical face 402 and the sensor circuit 403 is adjusted by reducing a size of a spot of infrared light condensed on a light receiving surface of the sensor circuit 403. The third cylindrical face 402 may have a concave shape engraved on an infrared ray condensing element to reduce a size of a spot of infrared light condensed on a light receiving surface of the sensor circuit 403.

The first cylindrical face 401a, the second cylindrical face 401b, and the third cylindrical face 402 in an infrared ray condensing element are preferably provided with an anti-reflection coating which is composed of a single layer film or multilayer film transmitting infrared light. When the first cylindrical face 401a, the second cylindrical face 401b, and the third cylindrical face 402 in an infrared ray condensing element are provided with an anti-reflection coating which is composed of a single layer film or multilayer film transmitting infrared light, it may be possible to improve transmittance of infrared light transmitting through an infrared ray condensing element. It may be possible to improve detection sensitivity for infrared light detected by the sensor circuit 403 in the infrared light sensor 400.

When an infrared ray radiated from a heat source enters an infrared ray condensing element of the infrared light sensor 400, infrared light transmits through the first cylindrical face 401a or the second cylindrical face 401b and is refracted by either the first cylindrical face 401a or the second cylindrical face 401b. Infrared light having been transmitted through the first cylindrical face 401a or the second cylindrical face 401b enters the second cylindrical face 402. Infrared light having entered the second cylindrical face 402 is refracted by the second cylindrical face 402 and exits from an infrared ray condensing element. Infrared light exiting from an infrared ray condensing element is condensed on a predetermined light receiving surface (pixel) in the sensor circuit 403 at a relatively short distance.

A size of the infrared light sensor 400 is often sufficiently small compared to a distance from the infrared light sensor 400 to a heat source, and therefore, it may often be possible to regard infrared light entering the infrared light sensor 400 as parallel rays of infrared light. When parallel rays of infrared light enter an infrared ray condensing element included in the infrared light sensor 400, an infrared ray condensing element has the first cylindrical face 401a and the second cylindrical face 401b, and therefore, it may be possible to receive parallel rays of infrared light with two different incident angles on one light receiving surface (pixel) of the sensor circuit 403 included in the infrared light sensor 400. When the sensor circuit 403 included in the infrared light sensor 400 has N light receiving surface(s) (pixel(s)), it may be possible to receive parallel rays of infrared light with 2N different incident angles on N light receiving surface(s) (pixel(s)) of the sensor circuit 403 included in the infrared light sensor 400, because an infrared ray condensing element has the first cylindrical face 401a and the second cylindrical face 401b.

Due to a structure of an infrared ray condensing element included in the infrared light sensor 400 as illustrated in FIG. 4A, FIG. 4B, and FIG. 4C, it may be possible to provide an infrared ray condensing element capable of condensing light with a broader range of incident angles and an infrared light sensor capable of detecting light with a broader range of incident angles, even when the sensor circuit 403 with a relatively few pixel(s) is/are provided. It may be possible to provide an infrared ray condensing element capable of condensing light at a higher angular resolution and an infrared light sensor capable of detecting light at a higher angular resolution. It may be possible to provide an infrared light sensor capable of obtaining information of presence or absence or a direction of a heat source at a higher precision.

An infrared ray condensing element further includes a support substrate 405 for supporting a part having the first cylindrical face 401a and second cylindrical face 401b and the third cylindrical face 402. A part having the first cylindrical face 401a and the second cylindrical face 401b and the third cylindrical face 402 are bonded to the support substrate 405. The support substrate 405 is bonded to the circuit board 404.

The circuit board 404 holds the sensor circuit 403, a signal amplification circuit, and a signal processing circuit, and packages the sensor circuit 403, a signal amplification circuit, and a signal processing circuit together with a part having the first cylindrical face 401a and the second cylindrical face 401b and the third cylindrical face 402 and the support substrate 405.

In the infrared light sensor 400, a length of an infrared ray condensing element in a direction perpendicular to a plane including an axis of the first cylindrical face 401a and an axis of the second cylindrical face 401b, that is, a distance between a straight line of a top of the first cylindrical face 401a or the second cylindrical face 401b and a bonding face of the circuit board 404 and the support substrate 405, is less than or equal to 1 mm, and therefore, it may be possible to provide a more compact infrared light sensor 400.

The first cylindrical face 401a, the second cylindrical face 401b, and the third cylindrical face 402 in an infrared ray condensing element included in the infrared light sensor 400 may be formed by a molding technique using a mold corresponding to a shape of an infrared ray condensing element.

The infrared light sensor 400 may be manufactured by a method including forming an infrared ray condensing element from a first semiconductor wafer, forming the sensor circuit 403, a signal amplification circuit, and a signal processing circuit from a second semiconductor wafer, bonding a first semiconductor wafer with a formed infrared ray condensing element and a second semiconductor wafer with the formed sensor circuit 403, signal amplification circuit, and signal processing circuit, and cutting a bonded first semiconductor wafer and second semiconductor wafer. It may be possible to manufacture the infrared light sensor 400 from a semiconductor wafer by using a semiconductor wafer process. For example, the first cylindrical face 401a, the second cylindrical face 401b, and the third cylindrical face 402 in an infrared ray condensing element are formed by using an etching technique for eliminating a portion of a first semiconductor wafer. The sensor circuit 403, a signal amplification circuit, and a signal processing circuit are formed by using an etching technique for eliminating a portion of a second semiconductor wafer. It may be possible to manufacture the infrared light sensor 400 with a lower cost and a higher productivity.

The infrared light sensor 400 may be used as, for example, a motion sensor.

Figure 9B:
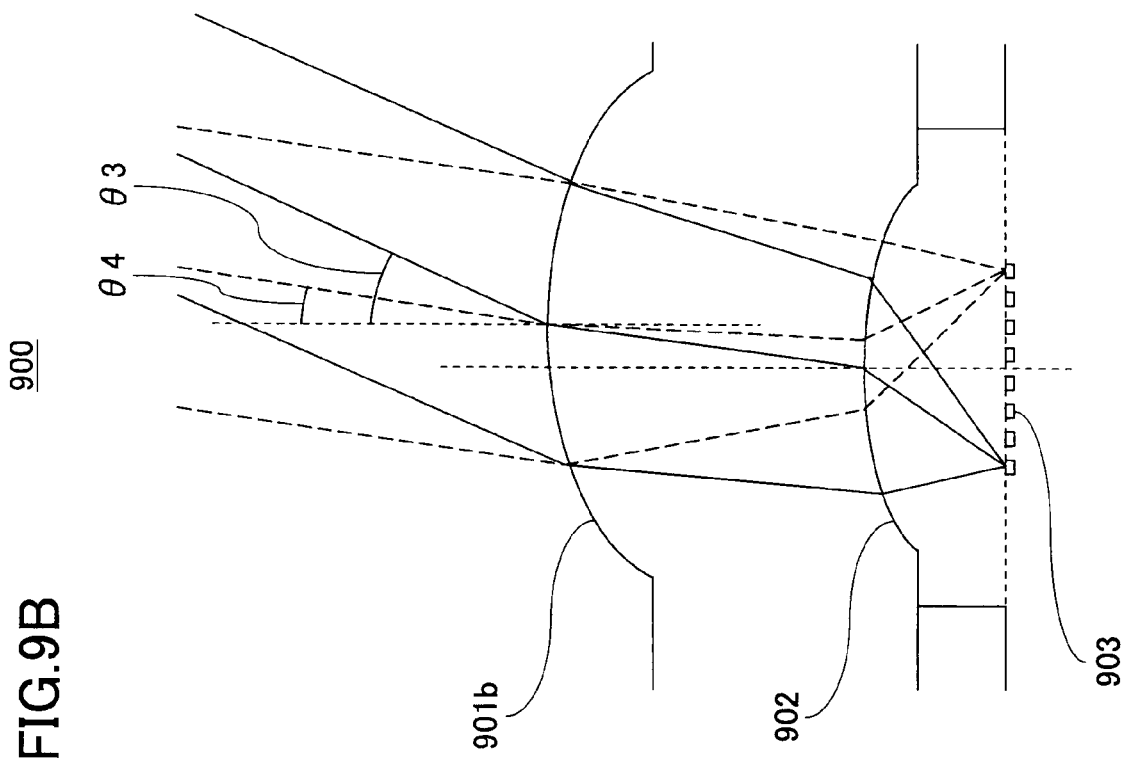
FIG. 9A and FIG. 9B are diagrams illustrating an example of a ray incident on an optical element in a first example of a light detection device according to a second embodiment of the present invention.
Figure 9A:
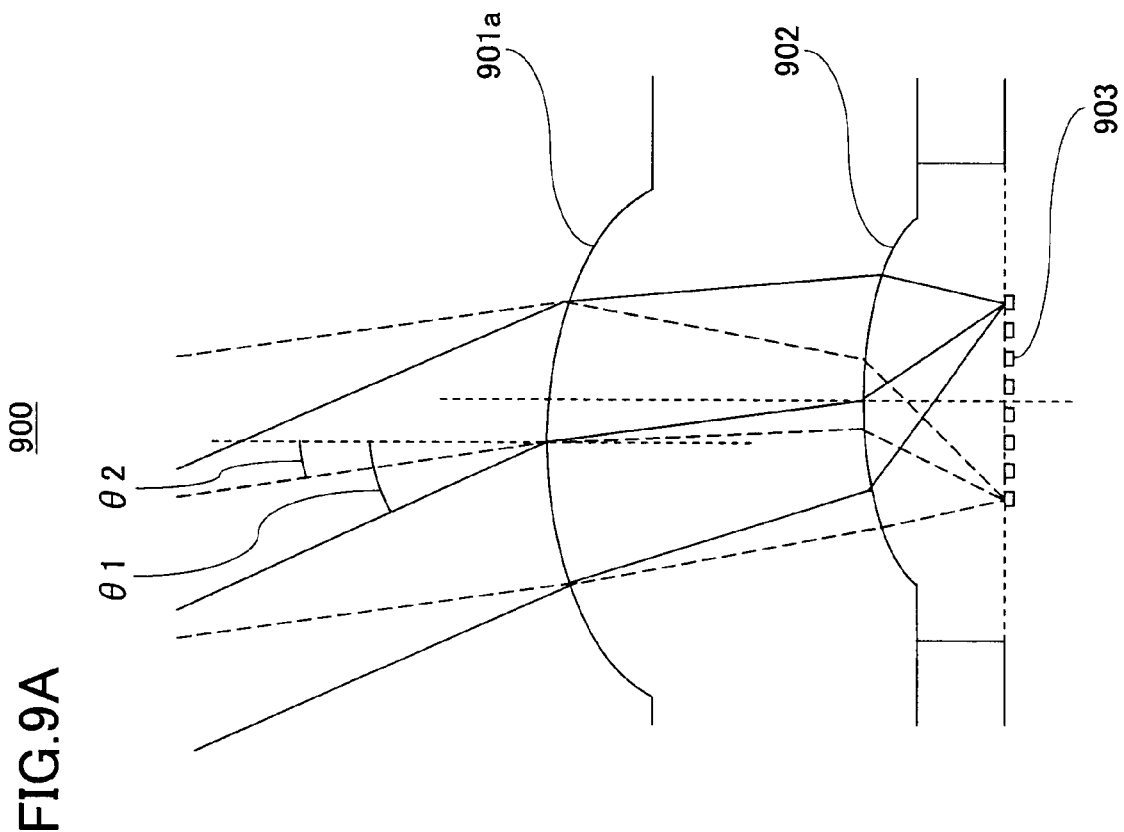

FIG. 9A and FIG. 9B are diagrams illustrating an example of a ray incident on an optical element in a first example of a light detection device according to a second embodiment of the present invention. FIG. 9A is a diagram illustrating an example of a ray incident on a first cylindrical face of an optical element in a first example of a light detection device according to a second embodiment of the present invention. FIG. 9B is a diagram illustrating an example of a ray incident on a second cylindrical face of an optical element in a first example of a light detection device according to a second embodiment of the present invention.

A first example of a light detection device according to a second embodiment of the present invention as illustrated in FIG. 9A and FIG. 9B is an infrared light sensor 900 similar to the light detection device 400 according to a second embodiment of the present invention as illustrated in FIG. 4A, FIG. 4B, and FIG. 4C.

The infrared light sensor 900 as illustrated in FIG. 9A and FIG. 9B is a light detection device for detecting infrared light and includes an infrared ray condensing element as an optical element according to a first embodiment of the present invention and a sensor circuit as an element for detecting infrared light condensed by an infrared ray condensing element.

As illustrated in FIG. 9A and FIG. 9B, an infrared ray condensing element has a first cylindrical face 901a and a second cylindrical face 901b at one side and a third cylindrical face 902 at the other side. The first cylindrical face 901a and the second cylindrical face 901b are convex and circular cylindrical faces having identical or common shapes and the third cylindrical face 902 is a concave and circular cylindrical face. A plane including an axis of the first cylindrical face 901a and an axis of the third cylindrical face 902 intersects with a plane including an axis of the second cylindrical face 901b and an axis of the third cylindrical face 902. A distance between an axis of the first cylindrical face 901a and an axis of the third cylindrical face 902 is identical to a distance between an axis of the second cylindrical face 901b and an axis of the third cylindrical face 902. A radius of curvature of the first cylindrical face 901a is identical to a radius of curvature of the second cylindrical face 901b. The first cylindrical face 901a and the second cylindrical face 901b have symmetric shapes with respect to a plane which is perpendicular to a plane including an axis of the first cylindrical face 901a and an axis of the second cylindrical face 901b and includes an axis of the third cylindrical face 902. (An axis of) The first cylindrical face 901a and (an axis of) the second cylindrical face 901b are shifted by a predetermined amount with respect to a plane which is perpendicular to a plane including an axis of the first cylindrical face 901a and an axis of the second cylindrical face 901b and includes an axis of the third cylindrical face 902. An infrared ray condensing element condenses infrared light incident on an infrared ray condensing element in a direction parallel to at least one of directions of an axis of the first cylindrical face 901a, an axis of the second cylindrical face 901b, and an axis of the third cylindrical face 902. "parallel" includes completely parallel and a degree regarded as substantially parallel.

In the infrared light sensor 900 as illustrated in FIG. 9A and FIG. 9B, a sensor circuit includes plural infrared ray receiving surfaces (pixels) 903 as plural elements for receiving light condensed by an infrared ray condensing element in a direction orthogonal to at least one of directions of an axis of the first cylindrical face 901a, an axis of the second cylindrical face 901b, and an axis of the third cylindrical face 902. "orthogonal" includes completely orthogonal and a degree regarded as substantially orthogonal. In the infrared light sensor 900 as illustrated in FIG. 9A and FIG. 9B, a sensor circuit including the plural infrared ray receiving surfaces (pixels) 903 is a one-dimensional array sensor.

In FIG. 9A and FIG. 9B, it is considered that infrared rays radiated from a heat source (light source) which may be considered to be present at infinity are incident on the infrared light sensor 900 as parallel rays. An infrared ray incident on the infrared light sensor 900 is condensed by an infrared ray condensing element and a condensed infrared ray may be received by one infrared ray receiving surface 903 included in a sensor circuit.

As illustrated in FIG. 9A, when an infrared ray radiated from a heat source is incident on the first cylindrical face 901a at a relatively large angle θ1 with respect to a direction perpendicular to a plane including an axis of the first cylindrical face 901*a* and axis of the second cylindrical face 901*b* of an infrared ray condensing element, an infrared ray radiated from a heat source transmits through the first cylindrical face 901*a* and the third cylindrical face 902 of an infrared ray condensing element and is refracted by the first cylindrical face 901*a* and the third cylindrical face 902 of an infrared ray condensing element. An infrared ray incident on the first cylindrical face 901*a* at an angle θ1 is condensed on the infrared ray receiving surface (pixel) 903 at one end included in a sensor circuit.

As illustrated in FIG. 9A, when an infrared ray radiated from a heat source is incident on the first cylindrical face 901*a* at a relatively small angle θ2 with respect to a direction perpendicular to a plane including an axis of the first cylindrical face 901*a* and axis of the second cylindrical face 901*b* of an infrared ray condensing element, an infrared ray radiated from a heat source transmits through the first cylindrical face 901*a* and the third cylindrical face 902 of an infrared ray condensing element and is refracted by the first cylindrical face 901*a* and the third cylindrical face 902 of an infrared ray condensing element. An infrared ray incident on the first cylindrical face 901*a* at an angle θ2 is condensed on the infrared ray receiving surface (pixel) 903 at the other end included in a sensor circuit.

When an infrared ray radiated from a heat source is incident on the first cylindrical face 901*a* at an angle greater than θ2 and less than θ1 with respect to a direction perpendicular to a plane including an axis of the first cylindrical face 901*a* and an axis of the second cylindrical face 901*b* of an infrared ray condensing element, an infrared ray radiated from a heat source transmits through the first cylindrical face 901*a* and the third cylindrical face 902 of an infrared ray condensing element and is refracted by the first cylindrical face 901*a* and the third cylindrical face 902 of an infrared ray condensing element. An infrared ray incident on a the first cylindrical face 901*a* at an angle greater than θ2 and less than θ1 is condensed on the infrared ray receiving surface (pixel) 903 between one end and the other end included in a sensor circuit.

When an infrared ray radiated from a heat source is incident on the second cylindrical face 901*b* at an angle greater than or equal to θ2 and less than or equal to θ1 with respect to a direction perpendicular to a plane including an axis of the first cylindrical face 901*a* and axis of the second cylindrical face 901*b* of an infrared ray condensing element, an infrared ray radiated from a heat source transmits through the second cylindrical face 901*b* and the third cylindrical face 902 of an infrared ray condensing element and is refracted by the second cylindrical face 901*b* and the third cylindrical face 902 of an infrared ray condensing element. An infrared ray incident on the second cylindrical face 901*b* at an angle greater than or equal to θ2 and less than θ1 or equal to is not condensed on the infrared ray receiving surface (pixel) 903 included in a sensor circuit.

As illustrated in FIG. 9B, when an infrared ray radiated from a heat source is incident on the second cylindrical face 901*b* at a relatively large angle θ3 (at an opposite side with respect to an angle θ1 or θ2) with respect to a direction perpendicular to a plane including an axis of the first cylindrical face 902*a* and axis of the second cylindrical face 901*b* of an infrared ray condensing element, an infrared ray radiated from a heat source transmits through the second cylindrical face 901*b* and the third cylindrical face 902 of an infrared ray condensing element and is refracted by the second cylindrical face 901*b* and the third cylindrical face 902 of an infrared ray condensing element. An infrared ray incident on the second cylindrical face 901*b* at an angle θ3 is condensed on the infrared ray receiving surface (pixel) 903 at one end included in a sensor circuit.

As illustrated in FIG. 9B, when an infrared ray radiated from a heat source is incident on the second cylindrical face 901*b* at a relatively small angle θ4 (at an opposite side with respect to an angle θ1 or θ2) with respect to a direction perpendicular to a plane including an axis of the first cylindrical face 901*a* and axis of the second cylindrical face 901*b* of an infrared ray condensing element, an infrared ray radiated from a heat source transmits through the second cylindrical face 901*b* and the third cylindrical face 902 of an infrared ray condensing element and is refracted by the second cylindrical face 901*b* and the third cylindrical face 902 of an infrared ray condensing element. An infrared ray incident on the second cylindrical face 901*b* at an angle θ4 is condensed on the infrared ray receiving surface (pixel) 903 at the other end included in a sensor circuit.

When an infrared ray radiated from a heat source is incident on the second cylindrical face 901*b* at an angle greater than θ4 and less than θ3 with respect to a direction perpendicular to a plane including an axis of the first cylindrical face 901*a* and an axis of the second cylindrical face 901*b* of an infrared ray condensing element, an infrared ray radiated from a heat source transmits through the second cylindrical face 901*b* and the third cylindrical face 902 of an infrared ray condensing element and is refracted by the second cylindrical face 901*b* and the third cylindrical face 902 of an infrared ray condensing element. An infrared ray incident on the second cylindrical face 901*b* at an angle greater than θ4 and less than θ3 is condensed on the infrared ray receiving surface (pixel) 903 between one end and the other end included in a sensor circuit.

When an infrared ray radiated from a heat source is incident on the first cylindrical face 901*a* at an angle greater than or equal to θ4 and less than or equal to θ3 with respect to a direction perpendicular to a plane including an axis of the first cylindrical face 901*a* and an axis of the second cylindrical face 901*b* of an infrared ray condensing element, an infrared ray radiated from a heat source transmits through the first cylindrical face 901*a* and the third cylindrical face 902 of an infrared ray condensing element and is refracted by the first cylindrical face 901*b* and the third cylindrical face 902 of an infrared ray condensing element. An infrared ray incident on the first cylindrical face 901*a* at an angle greater than or equal to θ4 and less than or equal to θ3 is not condensed on the infrared ray receiving surface (pixel) 903 included in a sensor circuit.

When a sensor circuit includes the plural infrared ray receiving surfaces (pixels) 903 in a direction orthogonal to at least one direction of an axis of the first cylindrical face 901*a*, an axis of the second cylindrical face 901*b*, and an axis of the third cylindrical face 902, it may be possible to provide an infrared light sensor 900 capable of detecting an infrared ray with a broader range of incident angle even when the number of the infrared ray receiving surface(s) (a pixel(s)) 903 of a sensor circuit is relatively small. It may be possible to provide a more compact infrared ray sensor 900. It may be possible to provide the infrared light sensor 900 capable of obtaining information of existence or displacement of a heat source with a broader range of angles.

When an infrared ray radiated from a heat source is incident on the first cylindrical face 901*a* and the second cylindrical face 901*b* at a continuous angle of θ1 to θ3 (or θ3 to θ1) with respect to a direction perpendicular to a plane including an axis of the first cylindrical face 901*a* and an axis of the second cylindrical face 901*b* of an infrared ray condensing element, an infrared ray incident on the first cylindrical face 901a at a continuous angle of θ1 to θ2 (or θ2 to θ1) is continuously condensed on the infrared ray receiving surfaces (pixels) 903 from one end to the other end included in a sensor circuit, and an infrared ray incident on the second cylindrical face 901b at a continuous angle of θ4 to θ3 (or θ3 to θ4) is continuously condensed on the infrared ray receiving surfaces (pixels) 903 from one end to the other end included in a sensor circuit again. When an infrared ray radiated from a heat source is incident on the first cylindrical face 901a and the second cylindrical face 901b at a continuous angle of θ1 to θ3 (or θ3 to θ1) with respect to a direction perpendicular to a plane including an axis of the first cylindrical face 901a and axis of the second cylindrical face 901b of an infrared ray condensing element. An infrared ray radiated from a heat source is twice condensed on the infrared ray receiving surface (pixel) 903 from one end to the other end included in a sensor circuit.

In the infrared light sensor 900 as illustrated in FIG. 9A and FIG. 9B, the first cylindrical face 901a, the second cylindrical face 901b, and the third cylindrical face 902, and the plural infrared ray receiving surfaces (pixels) 903 are provided in such a manner that either infrared rays passing through the first cylindrical face 901a and the third cylindrical face 902 or infrared rays passing through the second cylindrical face 901b and the third cylindrical face 902 are received by the plural infrared ray receiving surfaces (pixels) 903.

In the infrared light sensor 900 as illustrated in FIG. 9A and FIG. 9B, shapes and arrangement (relative positions) of the first cylindrical face 901a, the second cylindrical face 901b, and the third cylindrical face 902 and arrangement (relative positions) of the plural infrared ray receiving surfaces (pixels) 903 are determined in such a manner that either infrared rays passing through the first cylindrical face 901a and the third cylindrical face 902 or infrared rays passing through the second cylindrical face 901b and the third cylindrical face 902b are received by the plural infrared ray receiving surfaces (pixels) 903.

When either infrared rays passing through the first cylindrical face 901a and the third cylindrical face 902 or infrared rays passing through the second cylindrical face 901b and the third cylindrical face 902 are received by the plural infrared ray receiving surfaces (pixels) 903, an infrared ray radiated from a heat source is twice condensed on the infrared ray receiving surface (pixel) 903 from one end to the other end included in a sensor circuit, and therefore, an angular resolution of the infrared light sensor 900 for detecting an infrared ray is substantially twice an angular resolution for detecting an infrared ray, which is determined by the number of the infrared ray receiving surface(s) (the pixel(s)) 903.

When the first cylindrical face 901a, the second cylindrical face 901b, and the third cylindrical face 902, and the plural infrared ray receiving surface(s) (pixel(s)) 903 are provided in such a manner that either infrared rays passing through the first cylindrical face 901a and the third cylindrical face 902 or infrared rays passing through the second cylindrical face 901b and the third cylindrical face 902 are received by the plural infrared ray receiving surfaces (pixel(s)) 903, it may be possible to provide the infrared sensor 900 capable of detecting an infrared ray(s) at a higher angular resolution even when the number of the infrared receiving surface(s) (the pixel(s)) 903 of a sensor circuit is relatively small.

When existence (presence or absence) or displacement of an object for radiating an infrared ray is detected, information of a position or angle of an object may often be unnecessary and condensing of an infrared ray radiated from one object onto an infrared ray receiving surface (pixel) of a sensor circuit included in an infrared light sensor may only be required.

When the first cylindrical face 901a, the second cylindrical face 901b, and the third cylindrical face 902, and the plural infrared ray receiving surfaces (pixels) 903 are provided in such a manner that either infrared rays passing through the first cylindrical face 901a and the third cylindrical face 902 or infrared rays passing through the second cylindrical face 901b and the third cylindrical face 902 are received by the plural infrared ray receiving surfaces (pixels) 903, it may be possible to provide the infrared light sensor 900 capable of obtaining information of presence or displacement of a heat source at a higher precision.

Figure 5:
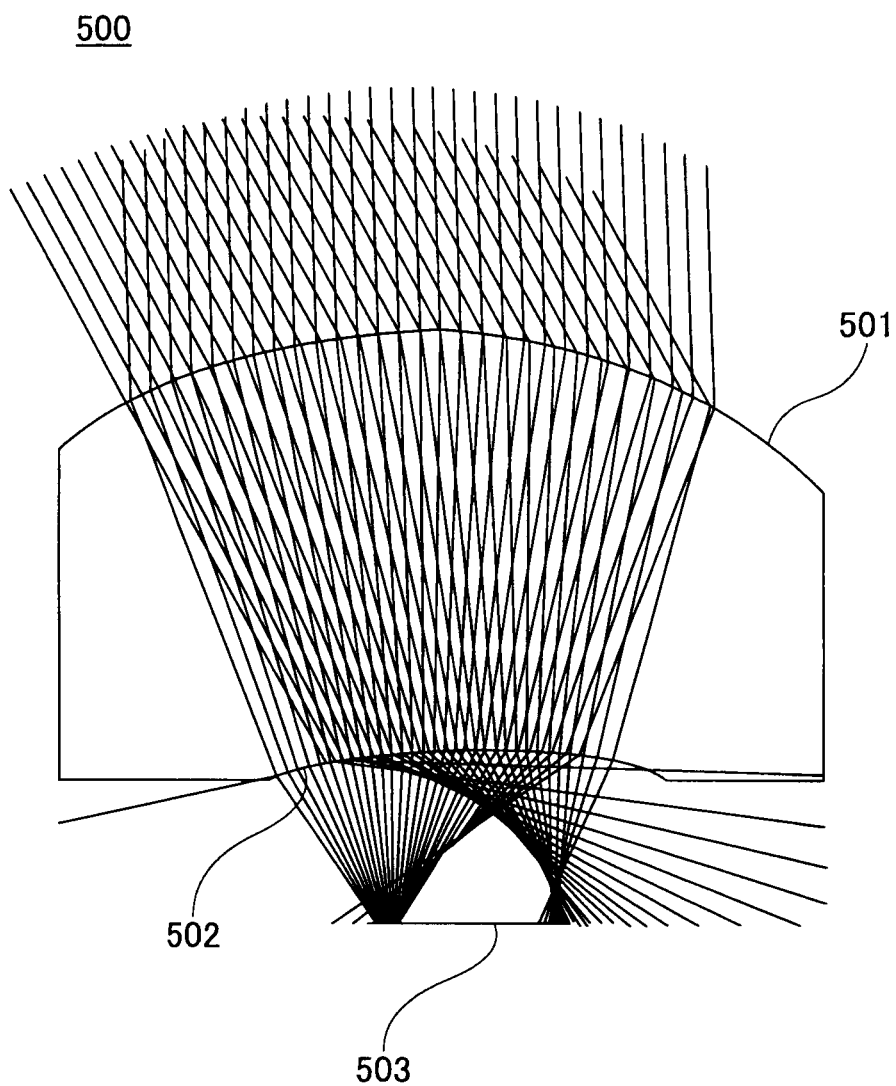
FIG. 5 is a diagram illustrating an example of a ray trace in a first example of a light detection device according to a second embodiment of the present invention.

FIG. 5 is a diagram illustrating an example of a ray trace in a first example of a light detection device according to a second embodiment of the present invention.

An example of the ray trace as illustrated in FIG. 5 is a result of a numerical simulation of the ray trace for an infrared ray condensing element included in an infrared ray sensor 500 similar to the infrared ray sensor 400 illustrated in FIG. 4. Radii of curvature of circular cylindrical faces of a first and second cylindrical faces 501 of an infrared ray condensing element included in the infrared ray sensor 500 illustrated in FIG. 5 were set at 1200 µm. A radius of curvature of a circular cylindrical face of the third cylindrical face 502 of an infrared ray condensing element included in the infrared ray sensor 500 as illustrated in FIG. 5 was set at 1350 µm. A distance between the first or second circular cylindrical face 501 and the third circular cylindrical face 502 (a thickness of an infrared ray condensing element) was set at 760 µm. The number of light receiving surfaces (pixels) of the sensor circuit 503 included in the infrared ray sensor 500 as illustrated in FIG. 5 was set at 8.

FIG. 5 illustrates a result of a ray trace for parallel rays of infrared light incident on the infrared ray sensor 500 when incident angles of parallel rays of infrared light with respect to a normal direction of a light receiving surface of the sensor circuit 503 included in the infrared ray sensor 500 were set at 1.875° and 28.125°. As illustrated in FIG. 5, parallel rays of infrared light with an incident angle of 1.875° were condensed on an extremely right pixel of a sensor circuit 503. Parallel rays of infrared light with an incident angle of 28.125° were condensed on an extremely left pixel of a sensor circuit 503.

It could be confirmed that parallel rays of infrared ray incident on the infrared ray sensor 500 were condensed on light receiving surfaces of the sensor circuit 500 included in the infrared ray sensor 500 by an infrared ray condensing element included in the infrared ray sensor 500.

Figure 10:
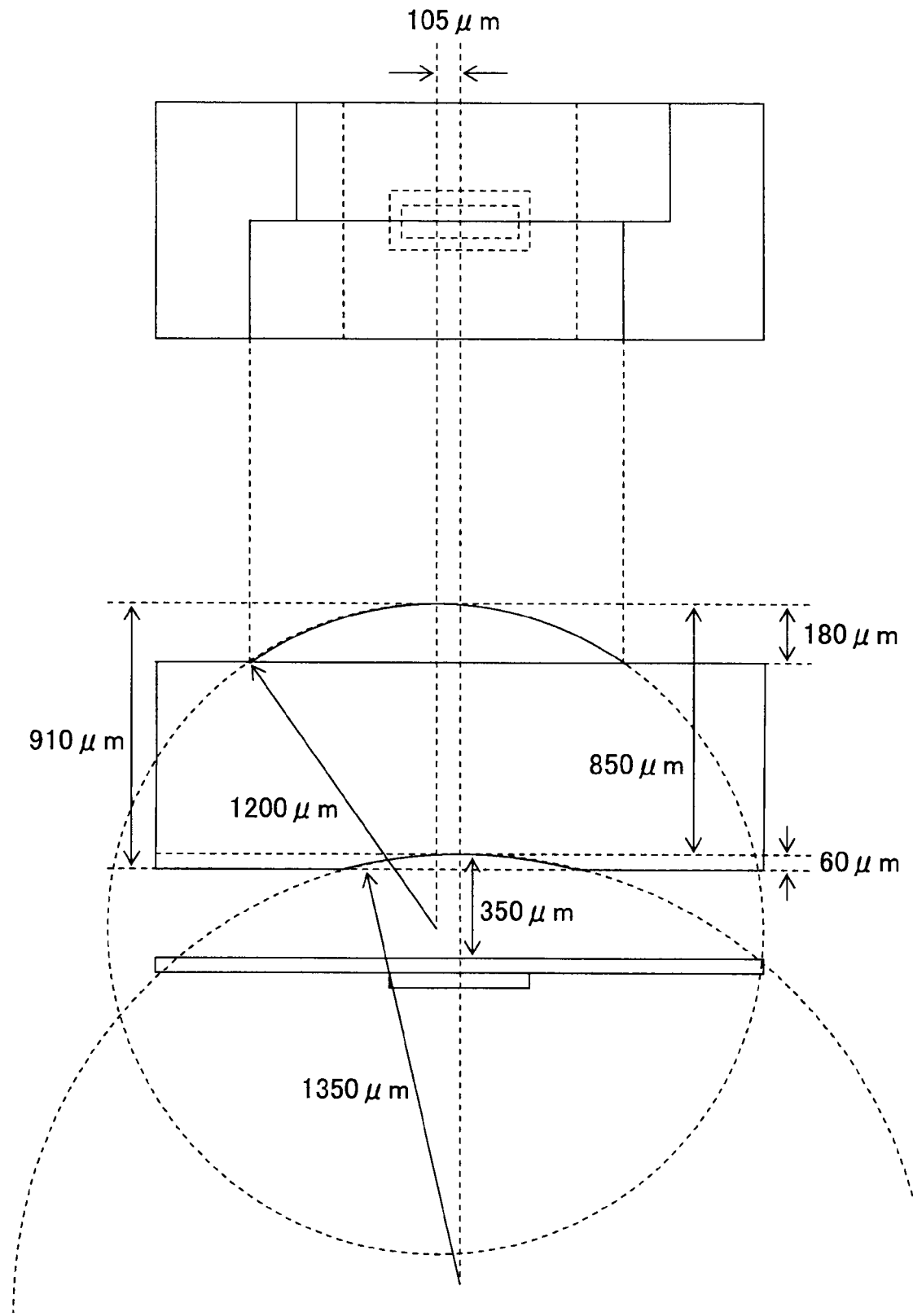
FIG. 10 is a diagram illustrating an example of a model of a light detection device and its parameters for a ray trace in a first example of a light detection device according to a second embodiment of the present invention.

FIG. 10 is a diagram illustrating an example of a model of a light detection device and its parameters for a ray trace in a first example of a light detection device according to a second embodiment of the present invention.

For the ray trace (a numerical simulation) in a first example of a light detection device according to a second embodiment of the present invention, "Light Tools" was used which is a commercially available lighting design and analysis software.

For a model of a light detection device for a ray trace in a first example of a light detection device according to a second embodiment of the present invention, an infrared ray sensor is used which included an infrared ray condensing element and a sensor circuit as illustrated in FIG. 10. An infrared ray condensing element has a first cylindrical face and a second cylindrical face at one side and a third cylindrical face at the other side. The first cylindrical face and the second cylindrical face are convex and circular cylindrical faces having identical or common shapes and the third cylindrical face is a concave and circular cylindrical face. A plane including an axis of the first cylindrical face and an axis of the third cylindrical face intersects with a plane including an axis of the second cylindrical face and an axis of the third cylindrical face. A distance between an axis of the first cylindrical face and an axis of the third cylindrical face is identical to a distance between an axis of the second cylindrical face and an axis of the third cylindrical face. A radius of curvature of the first cylindrical face is identical to a radius of curvature of the second cylindrical face. The first cylindrical face and the second cylindrical face have symmetric shapes with respect to a plane which is perpendicular to a plane including an axis of the first cylindrical face and an axis of the second cylindrical face and includes an axis of the third cylindrical face. (An axis of) The first cylindrical face and (an axis of) the second cylindrical face are shifted by a predetermined amount with respect to a plane which is perpendicular to a plane including an axis of the first cylindrical face and an axis of the second cylindrical face and includes an axis of the third cylindrical face.

For parameters of a light detection device for the ray trace in a first example of a light detection device according to a second embodiment of the present invention, parameters of an infrared ray sensor was used which included an infrared ray condensing element and a sensor circuit as illustrated in FIG. 10. Radii of curvature of convex and circular cylindrical faces which were the first cylindrical face and the second cylindrical face were 1200 μm. A radius of curvature of a concave and circular cylindrical face which was the third cylindrical face was 1350 μm. A thickness of an infrared ray condensing element in a direction perpendicular to a plane including an axis of the first cylindrical face and an axis of the second cylindrical face (a distance between a center (or axis) of the first cylindrical face or the second cylindrical face and a perimeter of the third cylindrical face) was 910 μm. A lens thickness of the infrared ray condensing element in a direction perpendicular to a plane including an axis of the first cylindrical face and an axis of the second cylindrical face (a distance between a center (or axis) of the first cylindrical face or a center (or axis) of the second cylindrical face and a center (or axis) of the third cylindrical face) was 850 μm. A lens thickness of the first cylindrical face or the second cylindrical face (a distance between a center (or axis) of the first cylindrical face or the second cylindrical face and a perimeter of the first cylindrical face or the second cylindrical face) was 180 μm. A lens thickness of the third cylindrical face (a distance between a center (or axis) of the third cylindrical face and a perimeter of the third cylindrical face) was 60 μm. A distance between a center (or axis) of the first cylindrical face or a center (or axis) of the second cylindrical face and a center (or axis) of the third cylindrical face (amount of decentering) was 105 μm.

Figure 6:
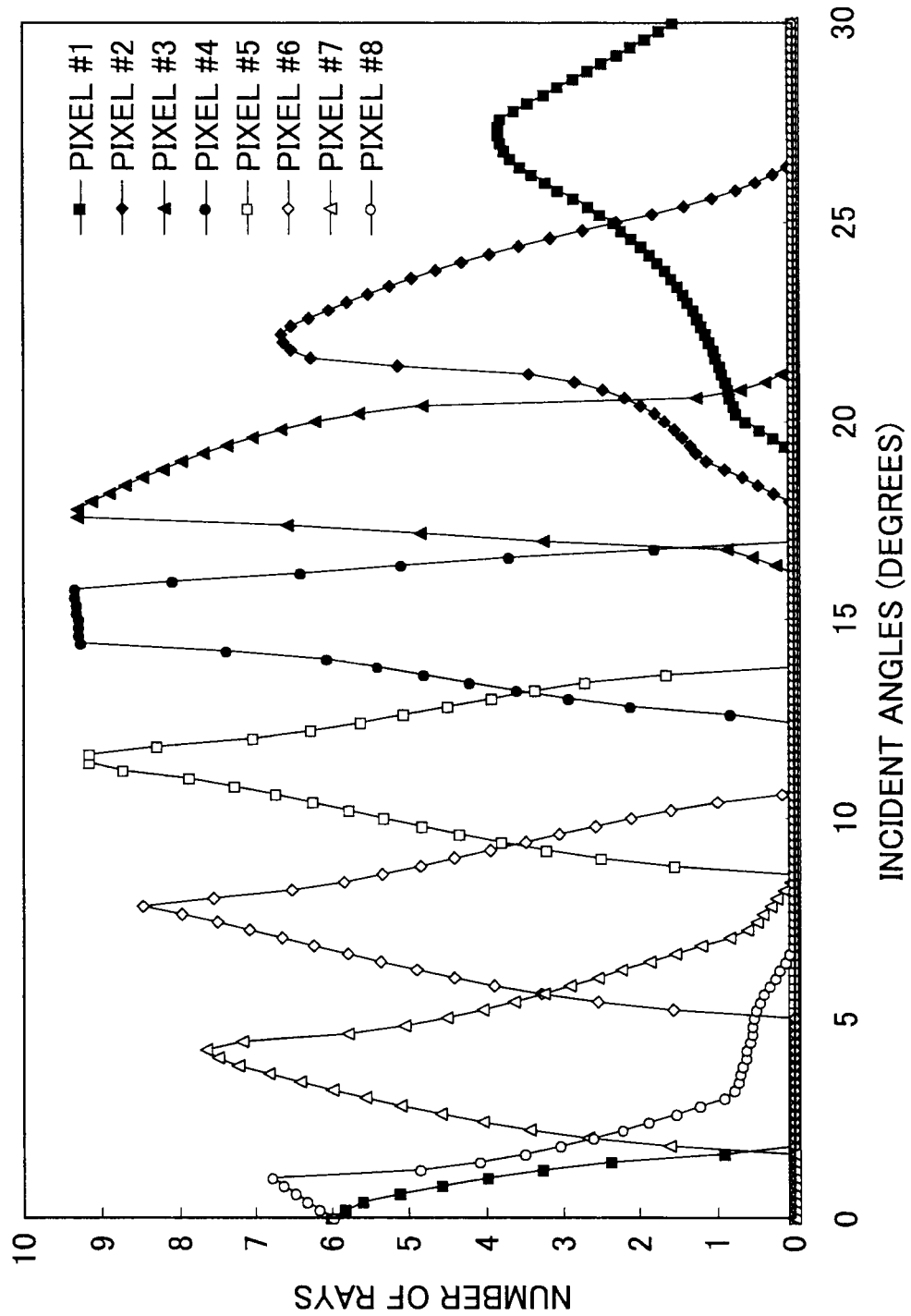
FIG. 6 is a diagram illustrating an example of a result of the ray trace on a first example of a light detection device according to a second embodiment of the present invention.

FIG. 6 is a diagram illustrating an example of a result of a ray trace in a first example of a light detection device according to a second embodiment of the present invention.

An example of a ray trace as illustrated in FIG. 6 is a result of a numerical simulation of the ray trace for an infrared ray condensing element included in an infrared ray sensor as illustrated in FIG. 10. "Light Tools" was used for a numerical simulation of the ray trace for an infrared ray condensing element included in an infrared ray sensor as illustrated in FIG. 10. FIG. 6 illustrates the number of a ray(s) of infrared light condensing on a light receiving surface of a sensor circuit included in an infrared ray sensor versus incident angles of parallel rays of infrared light incident on an infrared ray condensing element included in an infrared ray sensor as illustrated in FIG. 10. A sensor circuit included in an infrared ray sensor has 8 light receiving surfaces (pixels) and a size of each light receiving surface (pixel) is 40 μm×50 μm. A horizontal axis of FIG. 6 illustrates incident angles (degree(s)) of parallel rays of infrared light incident on an infrared ray condensing element included in an infrared ray sensor as illustrated in FIG. 5. A vertical axis of FIG. 6 illustrates the number of a ray(s) of infrared light condensing on a light receiving surface of a sensor circuit included in an infrared ray sensor. A value on a vertical axis of FIG. 6 is a value normalized by the number of a ray(s) of infrared light arriving at a light receiving surface of a sensor circuit included in an infrared ray sensor in a case where there is no infrared ray condensing element. In an example of the ray trace as illustrated in FIG. 6, a numerical simulation of the ray trace was conducted for only the infrared light ray(s) passing through the first cylindrical face and the third cylindrical face while symmetry for the first cylindrical face and the second cylindrical face was taken into consideration. In an example of the ray trace as illustrated in FIG. 6, an effect of multiple reflection of an infrared light ray in a circuit board included in an infrared ray sensor and reflection and refraction of an infrared light ray in a cavity structure provided on an infrared ray sensor have been considered.

From a result of the ray trace as illustrated in FIG. 6, it could be confirmed that it may be possible to separate parallel rays of infrared light with different incident angles incident on an infrared ray sensor by an infrared ray condensing element included in an infrared ray sensor. It could be confirmed that it may be possible to introduce parallel rays of infrared light with two different incident angles onto one light receiving surface (pixel) of a sensor circuit included in an infrared ray sensor (it may be possible to obtain substantially double an angular resolution) due to structures (symmetry of shapes) of the first cylindrical face and the second cylindrical face of an infrared ray condensing element included in the infrared ray sensor.

Figure 7:
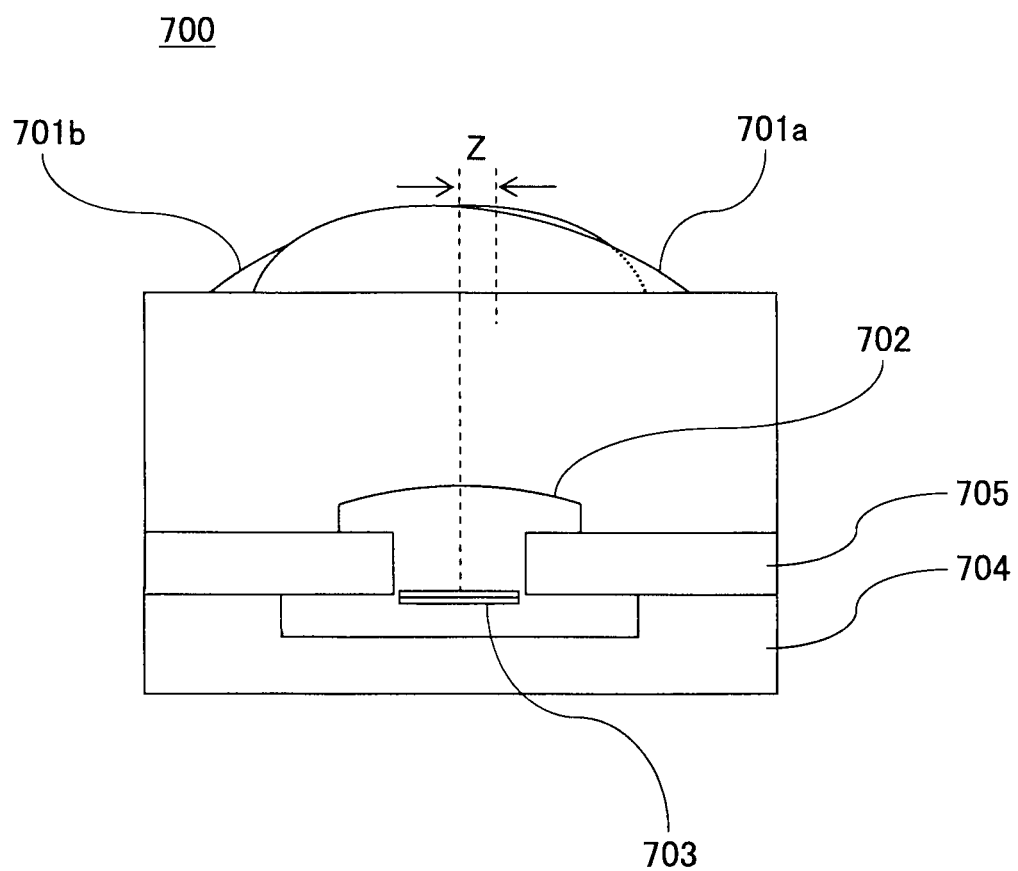
FIG. 7 is a diagram illustrating a structure of a second example of a light detection device according to a second embodiment of the present invention.

FIG. 7 is a diagram illustrating a structure of a second example of a light detection device according to a second embodiment of the present invention.

An infrared light sensor 700 as a second example of a light detection device according to a second embodiment of the present invention as illustrated in FIG. 7 is a light detection device for detecting infrared light and includes an infrared ray condensing element as an optical element according to a first embodiment of the present invention and a sensor circuit 703 as an element for detecting infrared light condensed by an infrared ray condensing element. The sensor circuit 703 is held by a circuit board 704. The sensor circuit 703 has plural infrared ray receiving surfaces (pixels) which are arranged one-dimensionally and receive infrared light, and converts infrared light received by an infrared ray receiving surface into an electric signal. The infrared light sensor 700 includes a signal amplification circuit for amplifying an electric signal output from the sensor circuit 703 and a signal processing circuit for obtaining information of presence or absence or a direction of a heat source from an output of a signal amplification circuit.

An infrared ray condensing element included in the infrared light sensor 700 is an optical element for condensing infrared light. An infrared ray condensing element condenses infrared light radiated from a heat source onto an infrared ray receiving surface (pixel) of a sensor circuit 703 depending on an incident angle of an infrared light ray.

An infrared ray condensing element is formed of a transparent semiconductor material for an infrared ray, such as silicon (Si) or germanium (Ge). Silicon (Si) is a transparent material for infrared light with a wavelength of about 10 μm. For a transparent material for infrared light, silicon (Si) is preferably used. When silicon (Si) is used for a transparent material for infrared light, not only may it be possible to form an infrared ray condensing element from silicon (Si) but it may also be possible to form the sensor circuit 703, the signal amplification circuit, and the signal processing circuit by using a CMOS process technique.

An infrared ray condensing element has a first cylindrical face 701a and a second cylindrical face 701b at a side of entrance of an infrared ray and a third cylindrical face 702 at a side of exit of an infrared ray. The first cylindrical face 701a and the second cylindrical face 701b are convex and non-circular cylindrical faces and the third cylindrical face 702 is a concave and circular cylindrical face. A plane including an axis of the first cylindrical face 701a and an axis of the third cylindrical face 702 intersects with a plane including an axis of the second cylindrical face 701b and an axis of the third cylindrical face 702. A distance between an axis of the first cylindrical face 701a and an axis of the third cylindrical face 702 is identical to a distance between an axis of the second cylindrical face 701b and an axis of the third cylindrical face 702. A radius of curvature of the first cylindrical face 701a is identical to a radius of curvature of the second cylindrical face 701b. The first cylindrical face 701a and the second cylindrical face 701b have mutually symmetric shapes with respect to a plane which is perpendicular to a plane including an axis of the first cylindrical face 701a and an axis of the second cylindrical face 701b and includes an axis of the third cylindrical face 702. The first cylindrical face 701a has an asymmetric shape with respect to a plane which is perpendicular to a plane including an axis of the first cylindrical face 701a and an axis of the second cylindrical face 701b and includes an axis of the third cylindrical face 702. The first cylindrical face 701a has a face with a relatively high curvature at a left side and has a face with a relatively low curvature at a right side, with respect to a plane which is perpendicular to a plane including an axis of the first cylindrical face 701a and an axis of the second cylindrical face 701b and includes an axis of the third cylindrical face 702. The second cylindrical face 701b has an asymmetric shape with respect to a plane which is perpendicular to a plane including an axis of the first cylindrical face 701a and an axis of the second cylindrical face 701b and includes an axis of the third cylindrical face 702. The second cylindrical face 701b has a face with a relatively low curvature at a left side and has a face with a relatively high curvature at a right side, with respect to a plane which is perpendicular to a plane including an axis of the first cylindrical face 701a and an axis of the second cylindrical face 701b and includes an axis of the third cylindrical face 702. (An axis of) The first cylindrical face 701a and (an axis of) the second cylindrical face 701b are shifted by a predetermined amount Z with respect to a plane which is perpendicular to a plane including an axis of the first cylindrical face 701a and an axis of the second cylindrical face 701b and includes an axis of the third cylindrical face 702.

In the infrared light sensor 700, a direction of an axis of the first cylindrical face 701a and an axis of the second cylindrical face 701b is a direction orthogonal to a direction of arrangement of one-dimensionally arranged light receiving surfaces (pixels) of the sensor circuit 703. The first cylindrical face 701a and the second cylindrical face 701b are mutually shifted in a direction of arrangement of one-dimensionally arranged light receiving surfaces (pixels) of the sensor circuit 703. A distance between the third cylindrical face 702 and the sensor circuit 703 is adjusted in such a manner that a size of a spot of infrared light condensed on a light receiving surface of the sensor circuit 703 is reduced. In order to reduce a size of a spot of infrared light condensed on a light receiving surface of the sensor circuit 703, the third cylindrical face 702 may have a concave shape engraved on an infrared ray condensing element.

The first cylindrical face 701a, the second cylindrical face 701b, and the third cylindrical face 702 in an infrared ray condensing element are preferably provided with an anti-reflection coating which is composed of a single layer film or multilayer film which transmits infrared light. When the first cylindrical face 701a, the second cylindrical face 701b, and the third cylindrical face 702 in an infrared ray condensing element are provided with an anti-reflection coating which is composed of a single layer film or multilayer film which transmits infrared light, it may be possible to improve a transmittance of infrared light which transmits through an infrared ray condensing element. It may be possible to improve a detection sensitivity of infrared light detected by the sensor circuit 703 in the infrared light sensor 700.

When infrared light radiated from a heat source is incident on an infrared ray condensing element in the infrared light sensor 400, infrared light transmits through the first circular cylindrical face 701a or the second circular cylindrical face 701b and is refracted by the first circular cylindrical face 701a or the second circular cylindrical face 701b correspondingly. Infrared light having transmitted through the first circular cylindrical face 701a or the second circular cylindrical face 701b is incident on the second circular cylindrical face 702. Infrared light having entered the second circular cylindrical face 702 is refracted by the second circular cylindrical face 702 and exits from an infrared ray condensing element. Infrared light having exited from an infrared ray condensing element is condensed onto a predetermined light receiving surface (pixel) of the sensor circuit 703 at a relatively short distance.

A size of the infrared light sensor 700 is often sufficiently small compared to a distance from the infrared light sensor 700 to a heat source, and therefore, it may often be possible to regard infrared light incident on the infrared light sensor 700 as parallel rays of infrared light. When parallel rays of infrared light are incident on an infrared ray condensing element included in the infrared light sensor 700, it may be possible to receive parallel rays of infrared light with two different incident angles on one light receiving surface (pixel) of the sensor circuit 703 included in the infrared light sensor 700, because an infrared ray condensing element has the first cylindrical face 701a and the second cylindrical face 701b. When the sensor circuit 703 included in the infrared light sensor 700 has N light receiving surfaces (pixels), it may be possible to receive parallel rays of infrared light with 2N different incident angles on N light receiving surfaces (pixels) of the sensor circuit 703 included in the infrared light sensor 700, because an infrared ray condensing element has the first cylindrical face 701a and the second cylindrical face 701b.

Due to a structure of an infrared ray condensing element included in the infrared light sensor 700 as illustrated in FIG. 7, it may be possible to provide an infrared ray condensing element capable of condensing light with a broader range of incident angles and an infrared light sensor capable of detecting light with a broader range of incident angles, even when the sensor circuit 703 with a relatively few pixel(s) is provided. It may be possible to provide an infrared ray condensing element capable of condensing light at a higher angular resolution and an infrared light sensor capable of detecting light at a higher angular resolution. It may be possible to provide an infrared light sensor capable of obtaining information of presence or absence or a direction of a heat source at a higher precision.

Because the first cylindrical face 701a and the second cylindrical face 701b of an infrared ray condensing element included in the infrared light sensor 700 as illustrated in FIG. 7 are non-circular cylindrical faces, it may be possible to adjust shapes of non-circular cylindrical faces of the first cylindrical face 701a and the second cylindrical face 701b, and thereby, reduce aberration of infrared light rays condensed on a light receiving surface (pixel) of the sensor circuit 703 included in the infrared ray sensor 700. For aberration of infrared light rays condensed on a light receiving surface (pixel) of the sensor circuit 703, there is provided, for example, a curvature of field of infrared light rays condensed on a light receiving surface (pixel) of the sensor circuit 703 or the like. It may be possible to provide an infrared ray condensing element capable of condensing light with more reduced aberration and an infrared light sensor capable of detecting light with more reduced aberration. It may be possible to provide an infrared ray condensing element capable of condensing light at a higher resolution and an infrared light sensor capable of detecting light at a higher resolution. It may be possible to provide an infrared light sensor capable of obtaining presence or absence or a direction of a heat source at an even higher precision.

An infrared ray condensing element further includes a support substrate 705 for supporting a part having the first cylindrical face 701a and the second cylindrical face 701b and the third cylindrical face 702. A part having the first cylindrical face 701a and the second cylindrical face 701b and the third cylindrical face 702 is integrated with the support substrate 705. The support substrate 705 is bonded to the circuit board 704.

The circuit board 704 holds the sensor circuit 703, a signal amplification circuit, and a signal processing circuit, and packages the sensor circuit 703, a signal amplification circuit, and a signal processing circuit together with a part having the first cylindrical face 701a and the second cylindrical face 701b and the third cylindrical face 702, and the support substrate 705.

In the infrared light sensor 700, a length of an infrared ray condensing element in a direction perpendicular to a plane including an axis of the first cylindrical face 701a and an axis of the second cylindrical face 701b, namely, a distance between a straight line on a top of the first cylindrical face 701a or the second cylindrical face 701b and the face bonding circuit board 704 and the support substrate 705, is less than or equal to 1 mm, and therefore, it may be possible to provide a more compact infrared light sensor 700.

The first cylindrical face 701a, the second cylindrical face 701b, and the third cylindrical face 702 in an infrared ray condensing element included in the infrared light sensor 700 are formed by a molding technique using a mold corresponding to a shape of an infrared ray condensing element.

The infrared light sensor 700 may be manufactured by a method including forming an infrared ray condensing element from a first semiconductor wafer, forming the sensor circuit 703, a signal amplification circuit, and a signal processing circuit from a second semiconductor wafer, bonding a first semiconductor wafer with a formed infrared ray condensing element and a second semiconductor wafer with the formed sensor circuit 703, signal amplification circuit, and signal processing circuit, and cutting a bonded first semiconductor wafer and second semiconductor wafer. It may be possible to manufacture the infrared light sensor 700 from a semiconductor wafer by using a semiconductor wafer process. For example, the first cylindrical face 701a, the second cylindrical face 701b, and the third cylindrical face 702 in an infrared ray condensing element are formed by using an etching technique for eliminating a portion of a first semiconductor wafer. The sensor circuit 703, a signal amplification circuit, and a signal processing circuit are formed by using an etching technique for eliminating a portion of a second semiconductor wafer. It may be possible to manufacture the infrared light sensor 700 with a lower cost and a higher productivity.

The infrared light sensor 700 may be used as, for example, a motion sensor.

Figure 12A:
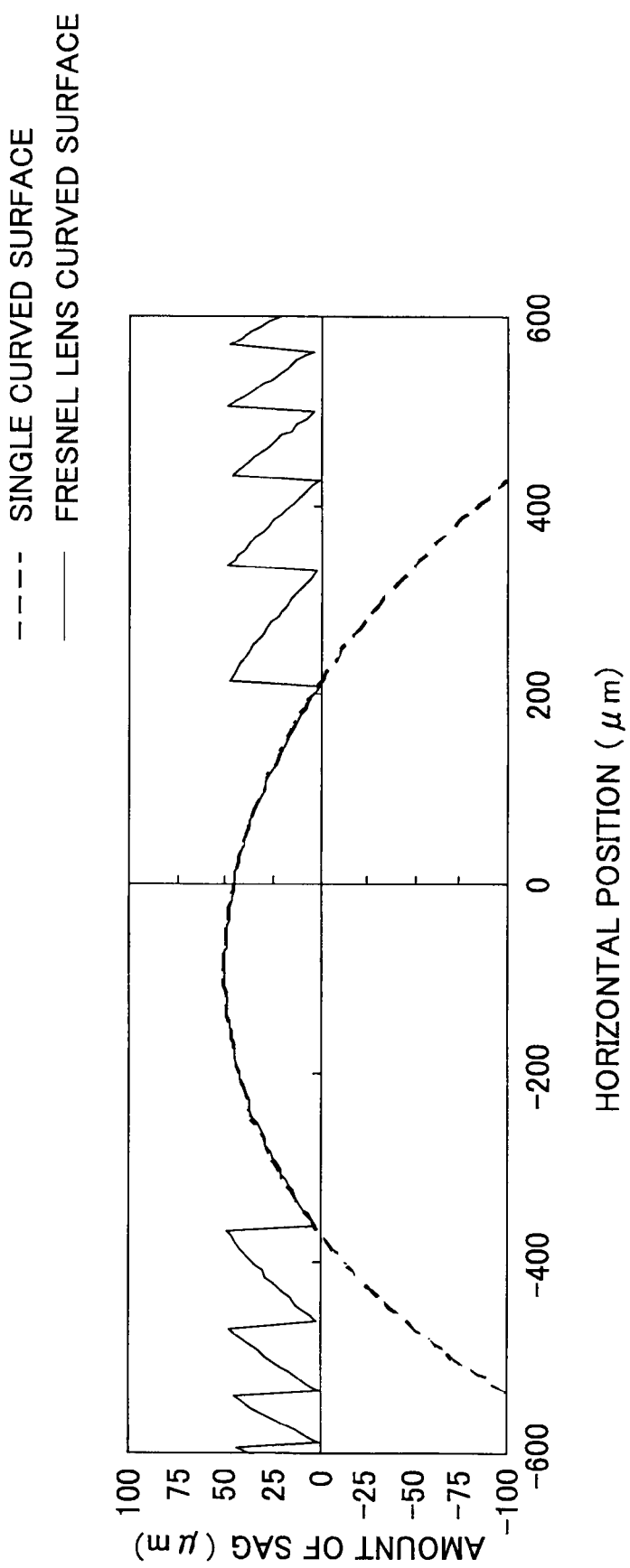

FIG. 12A and FIG. 12B are diagrams illustrating an example of a model of a light detection device for a ray trace and a result of its ray trace in a fourth example of a light detection device according to a second embodiment of the present invention. FIG. 12A is a diagram illustrating a model of a light detection device for a ray trace in a fourth example of a light detection device according to a second embodiment of the present invention. A horizontal axis of FIG. 12A represents a horizontal position (μm) of an optical element based on an axis of a third cylindrical face of an optical element included in an optical detection device. A vertical axis of FIG. 12A represents an amount of sag (μm) of a first cylindrical face or second cylindrical face of an optical element included in an optical detection device. FIG. 12B is a diagram illustrating an example of a result of a ray trace in a fourth example of a light detection device according to a second embodiment of the present invention.

An example of a model of a light detection device for a ray trace as illustrated in FIG. 12A is similar to an infrared ray sensor including an infrared ray condensing element and a sensor circuit as illustrated in FIG. 10, except a first cylindrical face and second cylindrical face of an optical element included in a light detection device. In an infrared ray sensor as illustrated in FIG. 12A, a first cylindrical face and second cylindrical face of an infrared ray condensing element included in an infrared ray sensor are similar to an example of an optical element according to a first embodiment of the present invention as illustrated in FIG. 11 and have Fresnel lens shapes. In an infrared ray condensing element included in an infrared ray sensor as illustrated in FIG. 12A, amounts of sag of a first cylindrical face and second cylindrical face which have Fresnel lens shapes and are convex faces were 50 μm. In an infrared ray condensing element included in an infrared ray sensor as illustrated in FIG. 12A, a radius of curvature of a third cylindrical face (having a shape of a concave face) of an infrared ray condensing element was 830 μm. A thickness of an infrared ray condensing element was 720 μm.

An example of a ray trace as illustrated in FIG. 12B is a result of a numerical simulation of a ray trace for an infrared ray condensing element included in an infrared ray sensor as illustrated in FIG. 12A. For a numerical simulation of a ray trace for an infrared ray condensing element included in an infrared ray sensor as illustrated in FIG. 12A, "CODE V" was used which is a commercially available optical design/simulation software. FIG. 12B illustrates the number of an infrared light ray(s) condensed on a light receiving surface(s) of a sensor circuit included in an infrared ray sensor versus incident angles of parallel rays of infrared light incident on an infrared ray condensing element included in an infrared ray sensor as illustrated in FIG. 12A. A horizontal axis of FIG. 12B illustrates incident angles (degrees) of parallel rays of infrared light incident on an infrared ray condensing element included in an infrared ray sensor as illustrated in FIG. 12A. A vertical axis of FIG. 12B illustrates the number of a ray(s)

of infrared light condensed on a light receiving surface of a sensor circuit included in an infrared ray sensor. A value on a vertical axis of FIG. 12B is a value normalized by the number of an infrared light ray(s) arriving at a light receiving surface of a sensor circuit included in an infrared ray sensor in a case where there is no infrared ray condensing element. In an example of a ray trace as illustrated in FIG. 12B, only a numerical simulation of a ray trace for an infrared light ray(s) passing through a first cylindrical face and a third cylindrical face was conducted while symmetry of a first cylindrical face and a second cylindrical face was taken into consideration. In an example of a ray trace as illustrated in FIG. 12B, none of the effects of multiple reflection of an infrared light ray in a circuit board included in an infrared light sensor and reflection and refraction of an infrared light ray(s) in a cavity structure provided for an infrared ray sensor was taken into consideration.

From a result of a ray trace as illustrated in FIG. 12B, it could be confirmed that it may be possible to separate parallel rays of infrared light with different incident angles incident on an infrared ray sensor due to an infrared ray condensing element included in an infrared ray sensor even when a first cylindrical face and second cylindrical face of an infrared ray condensing element included in an infrared ray sensor have Fresnel lens shapes. It could be confirmed that it may be possible to introduce parallel rays of infrared light with two different incident angles onto one light receiving surface (pixel) of a sensor circuit included in an infrared ray sensor (it may be possible to obtain substantially double an angular resolution) due to structures (symmetry of shapes) of a first cylindrical face and second cylindrical face of an infrared ray condensing element included in an infrared ray sensor even when a first cylindrical face and second cylindrical face of an infrared ray condensing element included in an infrared ray sensor have Fresnel lens shapes. It could be confirmed that an efficiency of receiving an infrared ray on a light receiving surface (pixel) of a sensor circuit included in an infrared ray sensor is not considerably reduced even when a first cylindrical face and second cylindrical face of an infrared ray condensing element included in an infrared ray sensor have Fresnel lens shapes.

FIG. 8A, FIG. 8B, and FIG. 8C are diagrams illustrating a structure of a third example of a light detection device according to a second embodiment of the present invention. FIG. 8A is a plan view of a third example of a light detection device according to a second embodiment of the present invention. FIG. 8B is a cross-sectional view of a third example of a light detection device according to a second embodiment of the preset invention in direction of AA'. FIG. 8C is a cross-sectional view of a third example of a light detection device according to a second embodiment of the present invention in a direction of BB'.

An infrared light sensor 800 as a third example of a light detection device according to a second embodiment of the present invention as illustrated in FIG. 8A, FIG. 8B, and FIG. 8C is an infrared light device for detecting infrared light and includes an infrared ray condensing element as an optical element according to a first embodiment of the present invention and a sensor circuit 803 as an element for detecting infrared light condensed by an infrared ray condensing element. The sensor circuit 803 is held by a circuit board 804. The sensor circuit 803 has plural infrared ray receiving surfaces (pixels) which are arranged one-dimensionally and receive infrared light, and converts an infrared light received by an infrared ray receiving surface into an electric signal. The infrared light sensor 800 includes a signal amplification circuit for amplifying an electric signal output from the sensor circuit 803 and a signal processing circuit for obtaining information of presence or absence or a direction of a heat source from an output of a signal amplification circuit.

An infrared ray condensing element included in the infrared light sensor 800 is an optical element for condensing infrared light. An infrared ray condensing element condenses infrared light radiated from a heat source onto infrared ray receiving surfaces (pixels) of the sensor circuit 803 depending on an incident angle of an infrared light ray.

An infrared ray condensing element is formed of a semiconductor material transparent to an infrared ray, such as silicon (Si) or germanium (Ge). Silicon (Si) is a material transparent to infrared light with a wavelength of about 10 μm. For a material transparent to infrared light, preferably, silicon (Si) is used. When silicon (Si) is used as a material transparent to infrared light, not only may it be possible to form an infrared ray condensing element of silicon (Si) but also it may be possible to form the sensor circuit 803, a signal amplification circuit, and a signal processing circuit by using a CMOS process technique.

An infrared ray condensing element has a first cylindrical face 801a and a second cylindrical face 801b at a side of entrance of an infrared ray and a third cylindrical face 802 at a side of exit of an infrared ray. An infrared ray condensing element has a first plane provided with the first cylindrical face 801a and a second plane provided with the second cylindrical face 801b. A first plane and a second plane are planes inclined with respect to a plane including an axis of the first cylindrical face 801a and an axis of the second cylindrical face 801b. A first plane and a second plane have symmetric shapes with respect to a plane which is perpendicular to a plane including an axis of the first cylindrical face 801a and an axis of the second cylindrical face 801b and includes an axis of the third cylindrical face 802. The first cylindrical face 801a and the second cylindrical face 801b are convex and circular cylindrical faces having identical or common shapes and the third cylindrical face 802 is a concave and circular cylindrical face. A plane including an axis of the first cylindrical face 801a and an axis of the third cylindrical face 802 intersects with a plane including an axis of the second cylindrical face 801b and an axis of the third cylindrical face 802. A distance between an axis of the first cylindrical face 801a and an axis of the third cylindrical face 802 is identical to a distance between an axis of the second cylindrical face 801b and an axis of the third cylindrical face 802. A radius of curvature of the first cylindrical face 801a is identical to a radius of curvature of the second cylindrical face 801b. The first cylindrical face 801a and the second cylindrical face 801b have symmetric shapes with respect to a plane which is perpendicular to a plane including an axis of the first cylindrical face 801a and an axis of the second cylindrical face 801b and includes an axis of the third cylindrical face 802. Due to a first plane and a second plane, (an axis of) the first cylindrical face 801a and (an axis of) the second cylindrical face 801b are rotated by a predetermined amount θ with respect to a plane which is perpendicular to a plane including an axis of the first cylindrical face 801a and an axis of the second cylindrical face 801b and includes an axis of the third cylindrical face 802.

In the infrared light sensor 800, a direction of an axis of the first circular cylindrical face 801a and an axis of the second circular cylindrical face 801b is a direction orthogonal to a direction of arrangement of one-dimensionally arranged light receiving surfaces (pixels) of the sensor circuit 803. The first cylindrical face 801a and the second cylindrical face 801b are mutually inclined with respect to a light receiving surface (pixel) with respect to one-dimensionally arranged light receiving surfaces (pixels) of the sensor circuit 803. A distance between the third cylindrical face 802 and the sensor circuit 803 is adjusted in such a manner that a size of a spot of infrared light condensed on a light receiving surface of the sensor circuit 803 is reduced. The third cylindrical face 802 may have a concave shape engraved on an infrared ray condensing element in order to reduce a size of a spot of infrared light condensed on a light receiving surface of the sensor circuit 803.

The first cylindrical face 801a, the second cylindrical face 801b, and the third cylindrical face 802 in an infrared ray condensing element are preferably provided with an anti-reflection coating which is composed of a single layer film or multilayer film transparent to infrared light. When the first cylindrical face 801a, the second cylindrical face 801b, and the third cylindrical face 802 in an infrared ray condensing element are provided with an anti-reflection coating which is composed of a single layer film or multilayer film transparent to infrared light, it may be possible to improve a transmittance of infrared light transmitting through an infrared ray condensing element. It may be possible to improve detection sensitivity for infrared light detected by the sensor circuit 803 in the infrared light sensor 803.

When infrared light radiated from a heat source is incident on an infrared ray condensing element of the infrared light sensor 800, infrared light transmits through the first circular cylindrical face 801a provided on a first plane or the second circular cylindrical face 801b provided on a second plane and is refracted by the first circular cylindrical face 801a provided on a first plane or the second circular cylindrical face 801b provided on a second plane correspondingly. Infrared light having transmitted through the first circular cylindrical face 801a or the second circular cylindrical face 801b is incident on the second circular cylindrical face 802. Infrared light entering the second circular cylindrical face 802 is refracted by the second circular cylindrical face 802 and exits from an infrared ray condensing element. Infrared light exiting from an infrared ray condensing element condenses on a predetermined light receiving surface (pixel) on the sensor circuit 803 at a relatively short distance.

A size of the infrared light sensor 800 is often sufficiently small compared to a distance from the infrared light sensor 800 to a heat source, and therefore, it may often be possible to regard infrared light entering the infrared light sensor 800 as parallel rays of infrared light. When parallel rays of infrared light are incident on an infrared ray condensing element included in the infrared light sensor 800, it may be possible to receive parallel rays of infrared light with two different incident angles on one light receiving surface (pixel) of the sensor circuit 803 included in the infrared light sensor 800, because an infrared ray condensing element has the first cylindrical face 801a provided on a first plane and the second cylindrical face 801b provided on a second plane. When the sensor circuit 803 included in the infrared light sensor 800 has N light receiving surfaces (pixels), it may be possible to receive parallel rays of infrared light with 2N different incident angles on N light receiving surfaces (pixels) of the sensor circuit 803 included in the infrared light sensor 800, because an infrared ray condensing element has the first cylindrical face 801a provided on a first plane and the second cylindrical face 801b provided on a second plane.

Due to a structure of an infrared ray condensing element included in the infrared light sensor 800 as illustrated in FIG. 8A, FIG. 8B, and FIG. 8C, it may be possible to provide an infrared ray condensing element capable of condensing light with a broader range of incident angles and an infrared light sensor capable of detecting light with a broader range of incident angles, even when a relatively few pixel(s) of the sensor circuit 803 is/are provided. It may be possible to provide an infrared ray condensing element capable of condensing light at a higher angular resolution and an infrared light sensor capable of detecting light at a higher angular resolution. It may be possible to provide an infrared light sensor capable of obtaining information of presence or absence or a direction of a heat source at a higher precision.

An infrared ray condensing element further includes a support substrate 805 for supporting a part having the first cylindrical face 801a provided on a first plane and the second cylindrical face 801b provided on a second plane and the third cylindrical face 802. A part having the first cylindrical face 801a provided on a first plane and the second cylindrical face 801b provided on a second plane and the third cylindrical face 802 is bonded to the support substrate 805. The support substrate 805 is bonded to the circuit board 804.

The circuit board 804 holds the sensor circuit 803, a signal amplification circuit, and a signal processing circuit, and packages the sensor circuit 803, a signal amplification circuit, and a signal processing circuit together with a part having the first cylindrical face 801a provided on a first plane and the second cylindrical face 801b provided on a second plane and the third cylindrical face 802 and the support substrate 805.

In the infrared light sensor 800, a length of an infrared ray condensing element in a direction perpendicular to a plane including an axis of the first cylindrical face 801a and an axis of the second cylindrical face 801b, namely, a distance between a straight line on a top of the first cylindrical face 801a provided on a first plane or the second cylindrical face 801b provided on a second plane and a bonding face of the circuit board 804 and the support substrate 805, is less than or equal to 1 mm, and therefore, it may be possible to provide a more compact infrared light sensor 800.

The first cylindrical face 801a provided on a first plane, the second cylindrical face 801b provided on a second plane, and the third cylindrical face 802, in an infrared ray condensing element included in the infrared light sensor 800, may be formed by a molding technique using a mold corresponding to a shape of an infrared ray condensing element.

The infrared light sensor 800 may be manufactured by a method including forming an infrared ray condensing element from a first semiconductor wafer, forming the sensor circuit 803, a signal amplification circuit, and a signal processing circuit from a second semiconductor wafer, bonding a first semiconductor wafer with a formed infrared ray condensing element and a second semiconductor wafer with the formed sensor circuit 803, signal amplification circuit, and signal processing circuit, and cutting a bonded first semiconductor wafer and second semiconductor wafer. It may be possible to manufacture the infrared light sensor 800 from a semiconductor wafer by using a semiconductor wafer process. For example, the first cylindrical face 801a provided on a first plane, the second cylindrical face 801b provided on a second plane, and the third cylindrical face 802, in an infrared ray condensing element, are formed by using an etching technique for eliminating a portion of a first semiconductor wafer. The sensor circuit 803, a signal amplification circuit, and a signal processing element are formed by using an etching technique for eliminating a portion of a second semiconductor wafer. It may be possible to manufacture the infrared light sensor 800 with a lower cost and a higher productivity.

The infrared light sensor 800 may be used as, for example, a motion sensor.

Figure 13:
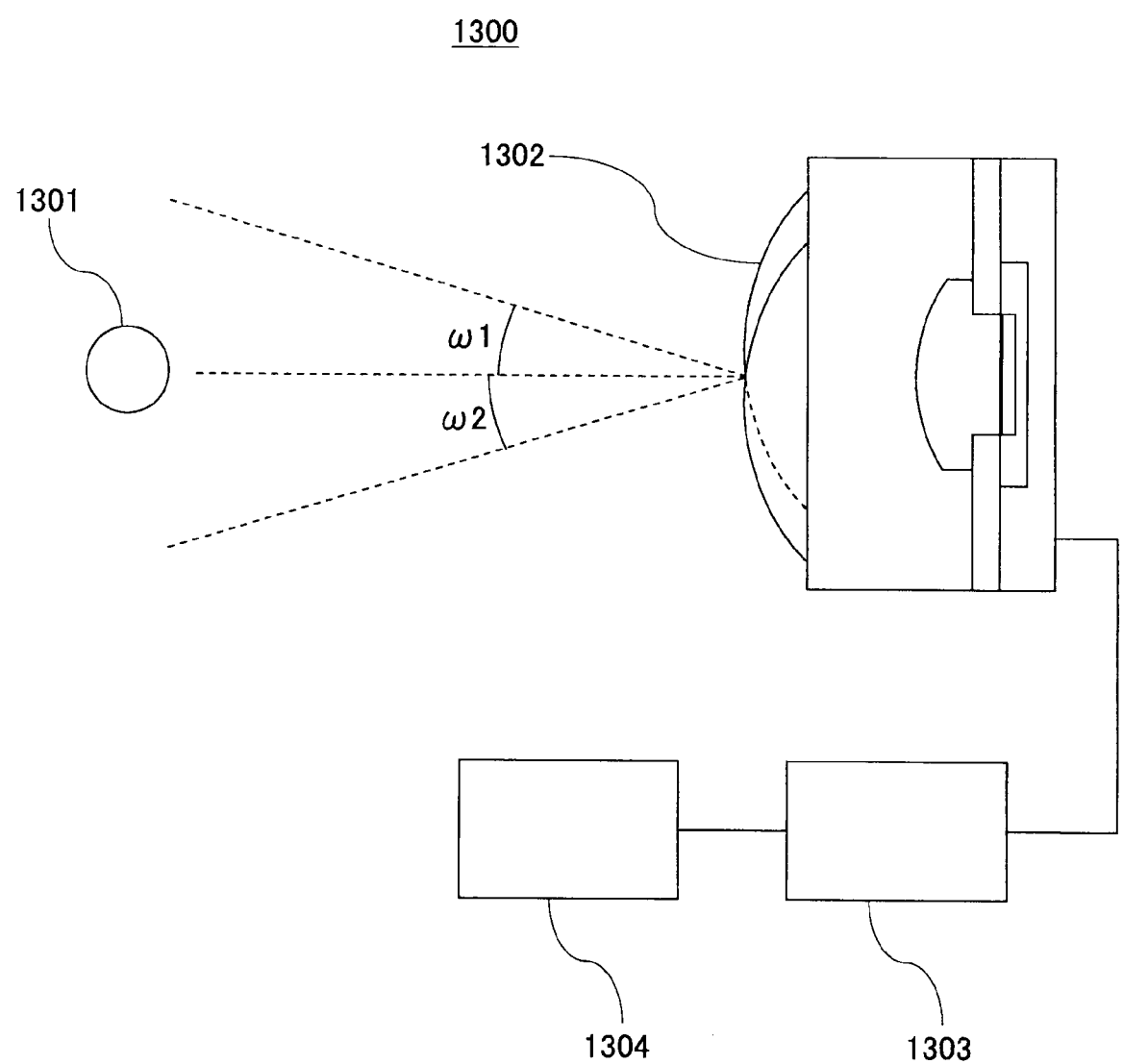
FIG. 13 is a diagram illustrating a general structure of an object sensing system according to a third embodiment of the present invention.

FIG. 13 is a diagram illustrating a general structure of an object sensing system according to a third embodiment of the present invention.

An object sensing system 1300 according to a third embodiment of the present invention includes a light detection device for detecting light from an object and a device for sensing existence or displacement of an object based on light detected by a light detection device. An object is, for example, a heat source 1301 for emitting at least an infrared ray. A light detection device is an infrared ray sensor 1302 as a light detection device according to a second embodiment of the present invention. The infrared ray sensor 1302 includes an infrared ray condensing element and a sensor circuit. An infrared ray condensing element has a first cylindrical face and a second cylindrical face at one side and a third cylindrical face at the other side.

In the object sensing system 1300 as illustrated in FIG. 13, an infrared ray emitted from the heat source 1301 is condensed on a sensor circuit of the infrared ray sensor 1302 by an infrared ray condensing element of the infrared ray sensor 1302. An angle of view of the infrared ray sensor 1302 is a sum of an angle of view ω1 of a first cylindrical face of an infrared ray condensing element and an angle of view ω2 of a second cylindrical face of an infrared ray condensing element. When the heat source 1301 is present in a field of view in the angle of view ω1 of a first cylindrical face of an infrared ray condensing element, an infrared ray emitted from the heat source 1301 passes through the first cylindrical face and the third cylindrical face of an infrared ray condensing element and is condensed by a sensor circuit. When the heat source 1301 is present in a field of view in the angle of view ω2 of the second cylindrical face of an infrared ray condensing element, an infrared ray emitted from the heat source 1301 passes through the second cylindrical face and the third cylindrical face of an infrared ray condensing element and is condensed on a sensor circuit. An infrared ray condensed by a sensor circuit is converted into N bit data for parallel output or time series data for serial output by a sensor circuit. N bit data for parallel output or time series data for serial output as obtained by a sensor circuit are output to a signal processing device 1303 connected to the infrared ray sensor 1302.

The signal processing device 1303 determines information of existence (presence or absence) or displacement of the heat source 1301 as an object in an angle of view of the infrared ray sensor 1302 based on data output from the infrared ray sensor 1302. For the signal processing device 1303, there is provided, for example, a signal amplification processing device, a differential processing device, a noise elimination processing device, a threshold determination device, or the like. Information determined by the signal processing device 1303 is transmitted to a controlled apparatus 1304 connected to the signal processing device 1303 and controlled by the signal processing device 1303, as, for example, flag output or temperature data. Data transmitted from the signal processing device 1303 to the controlled apparatus 1304 determine operation of the controlled apparatus 1304.

For the controlled apparatus 1304 which is controlled by the signal processing device 1303, there is provided, for example, a home electric appliance such as a personal computer, a television set, or an air conditioner, an office instrument, or an alarm for security application, or the like. The controlled apparatus 1304 is utilized, for example, for the purpose of energy management such as electric power saving or raising of caution for a person.

According to a third embodiment of the present invention, it may be possible to provide an object sensing system capable of sensing existence or displacement of an object based on light with a broader range of incident angles. According to a third embodiment of the present invention, it may be possible to provide an object sensing system capable of sensing existence or displacement of an object at a higher angular resolution based on light. It may be possible to provide a compact or lightweight object sensing system. It may be possible to provide an object sensing system capable of being installed in a compact electronic instrument. It may be possible to provide an object sensing system capable of being utilized as a device for automatically controlling an electronic instrument.

An optical element according to a first embodiment of the present invention, a light detection device according to a second embodiment of the present invention, and an object sensing system according to a third embodiment of the present invention, are an optical element for condensing light or an electromagnetic wave(s), a light detection device for detecting light or an electromagnetic wave(s), and an object sensing system based on light or an electromagnetic wave(s), respectively. An optical element according to a first embodiment of the present invention, a light detection device according to a second embodiment of the present invention, and an object sensing system according to a third embodiment of the present invention, are not limited to an optical element for condensing an infrared light or an infrared ray, a light detection device for detecting infrared light or an infrared ray, and an object sensing system based on infrared light or an infrared ray, respectively. For example, it may be possible to provide an optical element for condensing light or an electromagnetic wave(s) from an object, a light detection device for detecting light or an electromagnetic wave(s) from an object, and an object sensing system based on light or an electromagnetic wave(s) from an object by selecting a material transmitting light or an electric wave(s) from an object.

[Appendix]

Typical embodiments (1) to (18) of the present invention are described below.

Embodiment (1) is an optical element for condensing light, characterized in that the optical element has a first cylindrical face and a second cylindrical face at one side and a third cylindrical face at an other side and a plane including an axis of the first cylindrical face and an axis of the third cylindrical face intersects with a plane including an axis of the second cylindrical face and the axis of the third cylindrical face.

Embodiment (2) is the optical element as described in embodiment (1), characterized in that a distance between the axis of the first cylindrical face and the axis of the third cylindrical face is identical to a distance between the axis of the second cylindrical face and the axis of the third cylindrical face.

Embodiment (3) is the optical element as described in embodiment (1) or (2), characterized in that a radius of curvature of the first cylindrical face is identical to a radius of curvature of the second cylindrical face.

Embodiment (4) is the optical element as described in any of embodiments (1) to (3), characterized in that the first cylindrical face and the second cylindrical face are convex faces and the third cylindrical face is a concave face.

Embodiment (5) is the optical element as described in any of embodiments (1) to (4), characterized in that the optical element is formed of a material transparent to an infrared ray.

Embodiment (6) is the optical element as described in embodiment (5), characterized in that the material transparent to an infrared ray is a semiconductor material.

Embodiment (7) is the optical element as described in any of embodiments (1) to (6), characterized in that the first cylindrical face and the second cylindrical face have identical shapes.

Embodiment (8) is the optical element as described in any of embodiments (1) to (7), characterized in that the first cylindrical face and the second cylindrical face are circular cylindrical faces.

Embodiment (9) is the optical element as described in any of embodiments (1) to (7), characterized in that the first cylindrical face and the second cylindrical face are non-circular cylindrical faces.

Embodiment (10) is the optical element as described in any of embodiments (1) to (7), characterized in that the first cylindrical face and the second cylindrical face have symmetric shapes with respect to a plane being perpendicular to a plane including the axis of the first cylindrical face and the axis of the second cylindrical face and including the axis of the third cylindrical face.

Embodiment (11) is the optical element as described in any of embodiments (1) to (10), characterized in that the optical element has a first plane provided with the first cylindrical face and a second face provided with the second cylindrical face and the first plane and the second plane are planes inclined with respect to a plane including the axis of the first cylindrical face and the axis of the second cylindrical face.

Embodiment (12) is the optical element as described in embodiment (11), characterized in that the first plane and the second plane have symmetric shapes with respect to a plane being perpendicular to a plane including the axis of the first cylindrical face and the axis of the second cylindrical face and including the axis of the third cylindrical face.

Embodiment (13) is the optical element as described in any of embodiments (1) to (12), characterized in that a maximum value of a length of the optical element in a direction perpendicular to a plane including the axis of the first cylindrical face and the axis of the second cylindrical face is less than or equal to 1 mm.

Embodiment (14) is the optical element as described in any of embodiments (1) to (13), characterized in that the first cylindrical face and the second cylindrical face have Fresnel lens shapes.

Embodiment (15) is a light detection device for detecting light, characterized by including the optical element as described in any of embodiments (1) to (14) and an element for detecting light condensed by the optical element.

Embodiment (16) is the light detection device as described in embodiment (15), characterized in that the element for detecting light condensed by the optical element includes plural elements for receiving light condensed by the optical element in a direction orthogonal to a direction of at least one of the axis of the first cylindrical face, the axis of the second cylindrical face, and the axis of the third cylindrical face.

Embodiment (17) is the light detection device as described in embodiment (16), characterized in that the first cylindrical face, the second cylindrical face, and the third cylindrical face, and the plural elements for receiving light are provided in such a manner that either light passing through the first cylindrical face and the third cylindrical face or light passing through the second cylindrical face and the third cylindrical face is received by the plural elements for receiving light.

Embodiment (18) is an object sensing system, including a light detection device for detecting light from an object and a device for sensing existence or displacement of the object based on light detected by the light detection device, characterized in that the light detection device is the light detection device as described in any of embodiments (15) to (17).

Although the illustrative embodiment(s) and specific example(s) of the present invention have been described with reference to the accompanying drawings, the present invention is not limited to any of the illustrative embodiment(s) and specific example(s) and the illustrative embodiment(s) and specific example(s) may be altered, modified, or combined without departing from the scope of the present invention.

The present application claims the benefit of its priority based on Japanese patent application No. 2011-061629 filed on Mar. 18, 2011 and Japanese patent application No. 2012-015594 filed on Jan. 27, 2012, the entire content of which is hereby incorporated by reference herein.

What is claimed is:

1. An optical element for condensing light comprising:
    a first cylindrical face at one side;
    a second cylindrical face at the one side; and
    a third cylindrical face at an other side,
    wherein a plane including an axis of the first cylindrical face and an axis of the third cylindrical face intersects with a plane including an axis of the second cylindrical face and the axis of the third cylindrical face,
    wherein at least the axis of the third cylindrical face extends parallel to a first direction,
    wherein the first cylindrical face is a first surface that extends from a first end to a second end over a first distance along the first direction,
    wherein the second cylindrical face is a second surface that extends from a first end to a second end over a second distance along the first direction, and
    wherein the second end of the first cylindrical face is adjacent to the first end of the second cylindrical face.

2. The optical element as claimed in claim 1, wherein a distance between the axis of the first cylindrical face and the axis of the third cylindrical face is identical to a distance between the axis of the second cylindrical face and the axis of the third cylindrical face.

3. The optical element as claimed in claim 1, wherein a radius of curvature of the first cylindrical face is identical to a radius of curvature of the second cylindrical face.

4. The optical element as claimed in claim 1, wherein the first cylindrical face and the second cylindrical face are convex faces and the third cylindrical face is a concave face.

5. The optical element as claimed in claim 1, wherein the optical element is formed of a material transparent to an infrared ray.

6. The optical element as claimed in claim 5, wherein the material transparent to an infrared ray is a semiconductor material.

7. The optical element as claimed in claim 1, wherein the first cylindrical face and the second cylindrical face have identical shapes.

8. The optical element as claimed in claim 1, wherein the first cylindrical face and the second cylindrical face are circular cylindrical faces.

9. The optical element as claimed in claim 1, wherein the first cylindrical face and the second cylindrical face are non-circular cylindrical faces.

10. The optical element as claimed in claim 1, wherein the first cylindrical face and the second cylindrical face have symmetric shapes with respect to a plane being perpendicular to a plane including the axis of the first cylindrical face and the axis of the second cylindrical face and including the axis of the third cylindrical face.

11. The optical element as claimed in claim 1, wherein the optical element has a first plane provided with the first cylindrical face and a second plane provided with the second cylindrical face and the first plane and the second plane are planes inclined with respect to a plane including the axis of the first cylindrical face and the axis of the second cylindrical face.

12. The optical element as claimed in claim 11, wherein the first plane and the second plane have symmetric shapes with respect to a plane being perpendicular to a plane including the axis of the first cylindrical face and the axis of the second cylindrical face and including the axis of the third cylindrical face.

13. The optical element as claimed in claim 1, wherein a maximum value of a length of the optical element in a direction perpendicular to a plane including the axis of the first cylindrical face and the axis of the second cylindrical face is less than or equal to 1 mm.

14. The optical element as claimed in claim 1, wherein the first cylindrical face and the second cylindrical face have Fresnel lens shapes.

15. A light detection device for detecting light, wherein the light detection device includes the optical element as claimed in claim 1 and an element for detecting light condensed by the optical element.

16. The light detection device as claimed in claim 15, wherein the element for detecting light condensed by the optical element includes plural elements for receiving light condensed by the optical element in a direction orthogonal to a direction of at least one of the axis of the first cylindrical face, the axis of the second cylindrical face, and the axis of the third cylindrical face.

17. The light detection device as claimed in claim 16, wherein the first cylindrical face, the second cylindrical face, and the third cylindrical face, and the plural elements for receiving light are provided in such a manner that either light passing through the first cylindrical face and the third cylindrical face or light passing through the second cylindrical face and the third cylindrical face is received by the plural elements for receiving light.

18. An object sensing system, including a light detection device for detecting light from an object and a device for sensing existence or displacement of the object based on light detected by the light detection device, wherein the light detection device is the light detection device as claimed in claim 15.

19. A light detection device for detecting light comprising:
an optical element including a first cylindrical face and a second cylindrical face at a first side, and a third cylindrical face at a second side;
a detection element that detects light condensed by the optical element,
wherein a plane including an axis of the first cylindrical face and an axis of the third cylindrical face intersects with a plane including an axis of the second cylindrical face and the axis of the third cylindrical face, and
wherein the detection element includes plural elements for receiving light condensed by the optical element in a direction orthogonal to a direction of at least one of the axis of the first cylindrical face, the axis of the second cylindrical face, and the axis of the third cylindrical face.

* * * * *